United States Patent [19]

Suzuki et al.

[11] Patent Number: 4,980,716
[45] Date of Patent: Dec. 25, 1990

[54] FOCUS DETECTING DEVICE

[75] Inventors: Kenji Suzuki; Akira Ishizaki; Akira Akashi; Keisuke Aoyama; Terutake Kadohara, all of Yokohama, Japan

[73] Assignee: Canon Kabushiki Kaisha, Tokyo, Japan

[21] Appl. No.: 343,665

[22] Filed: Apr. 27, 1989

[30] Foreign Application Priority Data

Apr. 28, 1988 [JP] Japan .................................. 63-108801
Jul. 12, 1988 [JP] Japan .................................. 63-171846
Jul. 30, 1988 [JP] Japan .................................. 63-189654

[51] Int. Cl.$^5$ ............................................ G03B 13/36
[52] U.S. Cl. ..................................... 354/403; 354/406; 354/408
[58] Field of Search ................ 354/403, 406, 408, 165

[56] References Cited

U.S. PATENT DOCUMENTS

| | | | |
|---|---|---|---|
| 4,559,446 | 12/1985 | Suzuki | 354/408 |
| 4,617,459 | 10/1986 | Akashi et al. | |
| 4,618,236 | 10/1986 | Akashi et al. | 354/406 |
| 4,693,582 | 9/1987 | Kawamura et al. | |
| 4,771,308 | 9/1988 | Tejima et al. | 354/403 |
| 4,801,962 | 1/1989 | Akashi | |
| 4,801,963 | 1/1989 | Koyama et al. | 354/403 |
| 4,803,507 | 2/1989 | Akashi et al. | |
| 4,827,301 | 5/1989 | Matsui et al. | 354/403 |
| 4,835,561 | 5/1989 | Matsui | 354/403 |

*Primary Examiner*—Russell E. Adams
*Attorney, Agent, or Firm*—Fitzpatrick, Cella, Harper & Scinto

[57] ABSTRACT

A focus detecting device of the type in which the amount of focus adjustment is found from the amount of image deviation between object images formed on first and second sensor arrays. The magnitude of the regularity of the image pattern or the magnitude of the brightness/darkness deviation rate or the shape similarity is discriminated and light projection means is operated when the regularity is great or when the brightness/darkness deviation rate or the shape similarity is small.

23 Claims, 17 Drawing Sheets

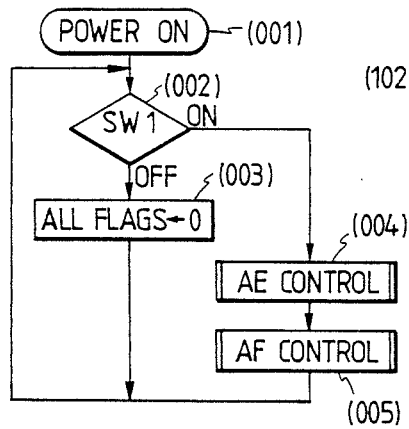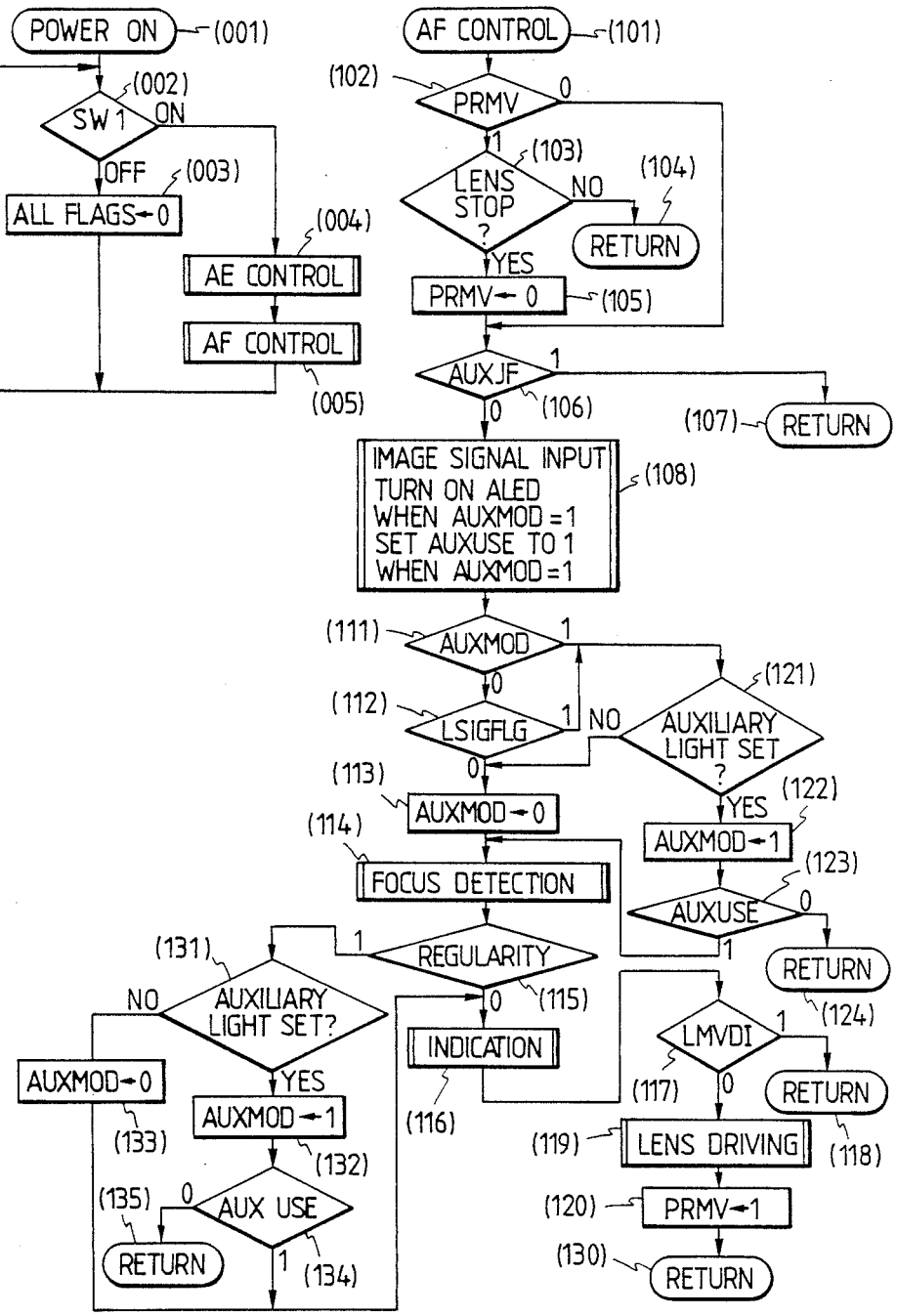

FIG. 14A(1)
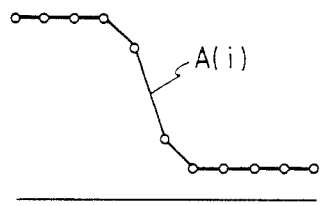
FIG. 14B(1)
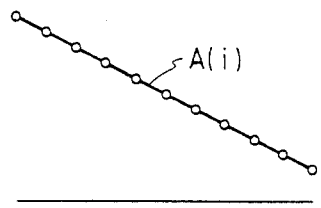
FIG. 14A(2)
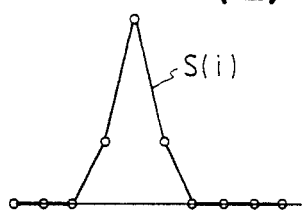
FIG. 14B(2)
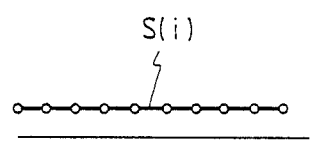
FIG. 14A(3)
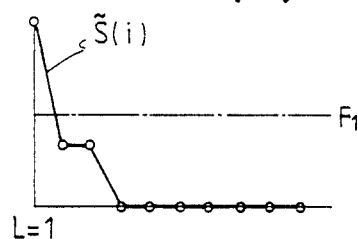
FIG. 14B(3)
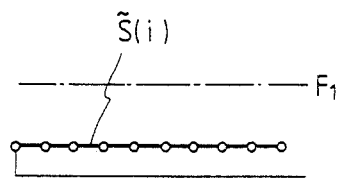

FIG. 16A(1)
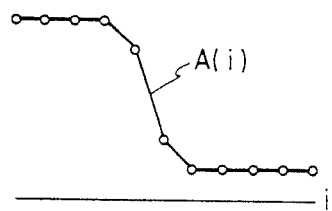
FIG. 16B(1)
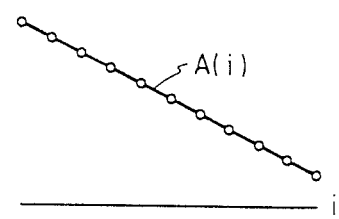
FIG. 16A(2)
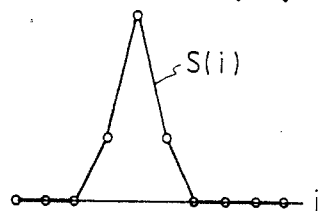
FIG. 16B(2)
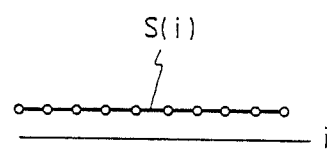
FIG. 16A(3)
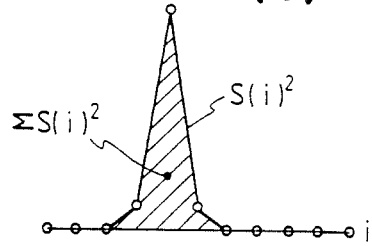
FIG. 16B(3)
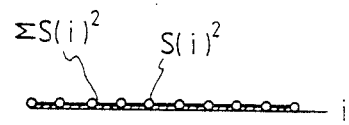

FOCUS DETECTING DEVICE

BACKGROUND OF THE INVENTION

1. Field of the Invention

This invention relates to improvements in a focus detecting capability for an object of regular pattern in a divided pupil image deviation detection type focus detecting device.

2. Related Background Art

As a type of the focus detecting device of a camera, there is known a method whereby the exit pupil of a photo-taking lens is divided into two by an optical system for focus detection, two object images formed by light fluxes passed through the pupil areas are received by a photoelectric conversion element array (for example, a CCD sensor array), the focus state of the photo-taking lens is detected from the output thereof and the photo-taking lens is driven on the basis of the result of the detection.

In FIG. 1 of the accompanying drawings, a field lens FLD is disposed with its optic axis common to the optic axis of a photo-taking lens LNS whose focus is to be detected. Two secondary imaging lenses FCLA and FCLB are disposed rearwardly of the field lens at positions symmetrical with respect to the optic axis. Sensor arrays SAA and SAB are further disposed rearwardly of the secondary imaging lenses. Diaphragms DIA and DIB are provided near the secondary imaging lenses FCLA and FCLB, respectively. The field lens FLD substantially images the exit pupil of the photo-taking lens LNS on the pupil planes of the two secondary imaging lenses FCLA and FCLB. As a result, light fluxes entering the secondary imaging lenses FCLA and FCLB, respectively, emerge from regions of equal areas on the exit pupil plane of the photo-taking lens LNS which correspond to the respective secondary imaging lenses FCLA and FCLB and do not overlap each other. When an aerial image formed near the field lens FLD is re-imaged on the surfaces of the sensor arrays SAA and SAB by the secondary imaging lenses FCLA and FCLB, two images on the sensor arrays SAA and SAB change their positions on the basis of the displacement of the position of the aerial image in the direction of the optic axis. Accordingly, if the amount of displacement (deviation) of the relative position of the two images on the sensor arrays is detected, the focus state of the photo-taking lens LNS can be known.

The focus state detecting method as described above may sometimes not operate well depending on the conditions of an object the most typical case is being an object of low luminance. The photoelectric charge accumulation time of a photoelectric sensor is limited in practical use, and unless there is a quantity of light high enough to produce sufficient photo-electric charges during that time, a signal cannot be formed. In such a case, even if the accumulation time is extended, the camera will become very difficult to use or a dark current will increase and the actually effective S/N will not be improved. So, it is often practised to carry an auxiliary light for focus detection on the camera and supplement the deficiency of the quantity of light during low luminance. The upper optical system of FIG. 1 is an auxiliary light projection system, and the emitted light from a light source LED illuminates a pattern chart CHT through a condenser lens CON, and the pattern of the pattern chart CHT is projected onto the surface of an object by a light projection lens LEL. If as in FIG. 1, the photo-taking lens and the light projection lens are discrete from each other, there will occur parallax, but if light is projected from the photo-taking lens, ghost image is liable to occur and therefore, usually, a light projection system is discretely provided outside the photo-taking system.

It is known that auxiliary light projection is effective for not only objects of low luminance but also objects of low contrast. During low contrast, there is no brightness-darkness pattern which is the basis of calculation, and focus detection cannot be accomplished. In such a case, a pattern can be projected onto the surface of an object to thereby forcibly give the object a brightness-darkness pattern and accomplish focus detection calculation on the basis thereof.

FIG. 2 of the accompanying drawings shows an example of the photoelectric conversion outputs of two images formed on the sensor arrays SAA and SAB by the construction of FIG. 1. The output of the sensor array SAA is A(i), and the output of the sensor array SAB is B(i). The number N of the picture elements of a sensor needs to be a minimum of five, and desirably should be several tens or more. A signal processing method for detecting the amount of image deviation PR from the image signals A(i) and B(i) is disclosed by the applicant assignee in Japanese Laid-Open Patent Application No. 58-142306, Japanese Laid-Open Patent Application No. 59-107313, Japanese Laid-Open Patent Application No. 60-101513 or Japanese Patent Application No. 61-160824.

The amount of image deviation is found by the method disclosed in these patent applications and on the basis thereof, the focus adjustment of the photo-taking lens is effected, whereby the photo-taking lens can be brought into the in-focus state.

In the method disclosed in the above-mentioned patent applications, for example, for two image signals $A(i)$ and $B(i)$ ($i = 1, 2, \ldots N$), $$V(m) = \sum_i \max\{A(i), B(i + k - m)\} - \sum_i \max\{A(i + k), B(i - m)\} \tag{1}$$

is calculated with respect to an integer value m(the amount of shift). max {A, B} represents the greater one of two real numbers A and B. The range of i in which the sum is taken is determined from the condition that suffixes $i$, $i+k-m$, $i+k$ and $i-m$ must be in the closed section [i, n ]. k is an integer constant and usually, k=1. Also, the range of m is concerned with the degree of the amount of image deviation to be detected and is not unconditionally determined, but usually the correlation amount defined by the equation (1) in which m is varied within $-N/2 \lesssim m \lesssim N/2$ is an example, and the following principle also holds quite true of the other known correlation amounts than this.

As the correlation amount formula, for example, the following is adopted besides the equation (1):

$$\Sigma \min\{A(i), B(i + k - m)\} - \Sigma \min\{A(i + k), B(i - m)\}$$
$$\Sigma |A(i) - B(i + k - m)| - \Sigma |A(i + k) - B(i - m)|$$
$$\Sigma |A(i) - B(i + k - m)|^2 - \Sigma |A(i + k) - B(i - m)|^2$$

The result of the above-mentioned equation (1) having been calculated with respect to each m is as shown in FIG. 3 of the accompanying drawings, wherein the location of m at which V(m) is inverted in its sign is the amount of image deviation expressed in the unit of picture element pitch. This value usually does not assume an integer. Assuming that there is an inversion image deviation $M_O$ including a fraction can be calculated by $$M_O = m_O |V(m_O)/\{V(m_O+1) - V(m_O)\}| \quad (2)$$

Means for dividing the exit pupil of the photo-taking lens, as disclosed in U.S. Pat. No. 4,185,191, besides the above-described example of the prior art, may be a number of units each comprising a minute lens disposed in front of a pair of photoelectric sensors and arranged on a straight line, and is not specifically restricted.

A focus detecting device based on the detection of the amount of image deviation as described above has the characteristic that generally it malfunctions for an object pattern of regularity. This drawback comes directly from the principle of detecting the deviation between two images.

Assuming, for example, that as shown in FIG. 4 of the accompanying drawings, the object image is a repetitive pattern of a period pf pitch P on the surface of a photoelectric sensor, if an attempt is made to make the positions of two images A(i) and B(i) coincident with each other, even if the image A(i) is shifted in the direction of arrow α or the image B(i) is shifted in the direction of arrow β, the two images can be made coincident with each other, and the amount of image deviation cannot be primarily defined. Further, the shift point at which the two images coincide with each other exists at each one pitch of regularity besides the above-mentioned α and β.

Due to the above-described circumstances, as regards an object having a regular pattern, the amount of image deviation cannot be detected by the prior-art method and accordingly, the defocus amount of the photo-taking lens cannot be calculated and the in-focus state of the photo-taking lens cannot be determined. Contrary to expectation, there are many regular patterns in artificial structures, such as window lattices, railings, blinds, check or striped cloth and lined-up bookshelves, and often these cannot be neglected as the objects of a camera.

The focus detecting method based on the detection for the amount of image deviation as described above has the characteristic that it is not only weak to said regular patterns, but also the error is generally great for the patterns of objects in which the fluctuation of brightness and darkness is gentle. For example, objects having illumination distributions as shown in FIGS. 12A-12C of the accompanying drawings are objects of low brightness/darkness deviation rate. Among these, the pattern of FIG. 12C is that of a so-called low contrast object and originally has a small fluctuation of brightness and darkness due to the deficiency of the absolute value contrast of the object. Here, the contrast is usually the absolute amount of a change in brightness and darkness defined by $$C = \max\{A(i)\} - \min\{A(i)\}$$

or $$C = \sum_{i=2}^{N} |A(i) - A(i-1)|$$

from the image signal A(i) output from the photoelectric conversion element array. For a low contrast object as shown in FIG. 12C, there is known a method of detecting the state thereof and taking some countermeasure, as previously described. However, there are many cases where as shown in FIGS. 12A and 12B, the contrast defined by the equation representing said C is high, but the change in brightness and darkness is gentle and accurate focus detection cannot be accomplished. When the contrast is calculated with respect to these objects, there is obtained a value which does not differ greatly from the edge pattern of FIG. 12D, but actually, in a situation wherein the focus detection error is great and particularly, electrical noise and optical noise such as ghosts are added, accuracy is remarkably bad for an object having a gentle change is brightness and darkness. This is a problem common to the algorithms in which the zero cross point is found as in FIG. 3. In the pattern as shown in FIG. 12D wherein the difference between brightness and darkness is localized, the steep difference between the brightness and darkness thereof is grasped and therefore, the influence of noise is relatively small, while in a pattern wherein the difference between brightness and darkness changes gently, the correlation signal is liable to be influenced by electrical and optical noises. In fact, if the pattern of FIG. 12A and the pattern of FIG. 12D are compared with each other under the same condition of the contrast of the equation $C = \max\{A(i)\} - \min\{A(i)\}$ and under the electrical noise condition of the same level, the focus detection accuracy differs twice or more therebetween, and if an optical ghost is further added, the difference increases further.

Furthermore, the focus detecting method based on the detection of the amount of image deviation as described above is bases on the premise that the pattern shapes of the two optical images A(i) and B(i) agree with each other and only their positions shift relative to each other and therefore, even the above-described calculation algorithm of the amount of image deviation is based on the fact that the pattern shapes of the two images are equal to each other, and if the shapes of the optical images differ from each other, it will immediately provide a factor of an error and the operating performance of the system will be remarkably deteriorated. Therefore, it is important in manufacture to maintain the shape similarity between the two optical images, and designing and manufacturing have been performed with close attention paid, for example, to the identity of the openings of the diaphragms DIA and DIB, the imaging balance of the secondary imaging lenses FCLA and FCLB, the sensitivity irregularity of the photo-electric conversion element arrays SAA and SAB, etc.

However, whatever consideration may be given to the focus detecting optical system, where there are two or more objects of different distances in the focus detection field seen by the photoelectric conversion element arrays SAA and SAB, or where due to a backlit situation of high intensity, a ghost occurring in the photo-taking lens LNS mingles with the focus detecting optical system, the shape similarity between the two optical images is not maintained. Where there are two or more objects of different distances in the focus detection field (the so-called far-and-near concurrence condition), the object field seen from each of the divided pupil areas has a parallax and therefore, under whatever condition the defocus state of the photo-taking lens LNS may be, the two optical images become such as shown in FIG. 19C of the accompanying drawings, and their shapes do not agree with each other. This is theoretical. Usually, in such case, the photo-taking lens is focused to one of the objects lying at different distances, or is focused to an intermediate distance between those objects, with a result that the lens is defocused to any object. In the former case, to whcih object the photo-taking lens should be focused cannot be foreseen and therefore, it is not always the main object intended by the photographer, and in the latter case, there is no object to which the lens should be focused and therefore, in any case, it is a problem.

A counter-light ghost occurs in the case of outdoor photographing with the sun placed in front of the camera, as well as in the case of an object such as a figure at the window or an object adjacent to artificial illumination. The distribution of the quantity of light by the ghost scarcely occurs in the same manner for two images and the level difference therebetween is great and therefore, the similarity between two images is remarkably broken as shown in FIGS. 19A and 19B of the accompanying drawings. Heretofore, it has usually been the case that under such conditions, the reliability of focus detection is reduced to result in malfunctioning or deterioration of the focusing accuracy. According to the most advanced method, such a situation can be recognized, but the manner of coping with such a situation is to stop the automatic focus adjusting function of the system and display that effect, or to change the calculation algorithm in accordance with the photoelectric conversion signal of a bad condition. The latter is to limit the actually effective focus detection field used in calculation by software, for example, in the case of far-and-near concurrence, and in a counter-light ghost, it is known to eliminate a ghost component including much of a relatively low spatial frequency component from the object pattern by digital filtering means.

The above-described method obtains a predetermined effect, but since the original image signal originates from inferior optical images having no coincidence in shape, it is often the case that the result of calculation is not sufficient in respect of reliability. Therefore, in a focus detecting device of the pupil division image deviation detection type, it has heretofore been an important task to maintain a highly reliable focus detecting operation even under such a bad condition.

SUMMARY OF THE INVENTION

One aspect of the invention is to provide a focus detecting device or a distance detecting device which is based on the above-described detection of the amount of image deviation and which discriminates whether the image pattern is a regular pattern and which, when the image pattern is a regular pattern, renders light projection means into a light projecting state and effects the detection of the amount of image deviation by the output of a sensor in the light projecting state.

Another aspect of the application is to provide a focus detecting device or a distance detecting device which is based on the above-described detection of the amount of image deviation and which calculates the brightness/darkness deviation rate or the shape similarity between image patterns, and which, when the brightness/darkness deviation rate is small or the similarity is small, renders light projection means into a light projecting state and effects the detection of the amount of image deviation by the output of a sensor in the light projecting state.

Another aspect of the application is to provide a calculating device for discriminating said regularity, said brightness darkness deviation rate or said similarity.

Other objects of the present invention will become apparent from the following detailed description of embodiments thereof taken in conjunction with the accompanying drawings.

BRIEF DESCRIPTION OF THE DRAWINGS

FIGS. 9A and 9B illustrate the operation of the focus detecting device shown in FIG. 6.

FIGS. 14A and 14B illustrate examples of the discrimination of the brightness/darkness deviation rate.

FIGS. 16A and 16B illustrate other examples of the discrimination of the brightness/darkness deviation rate.

DETAILED DESCRIPTION OF THE PREFERRED EMBODIMENT

Figure 5:
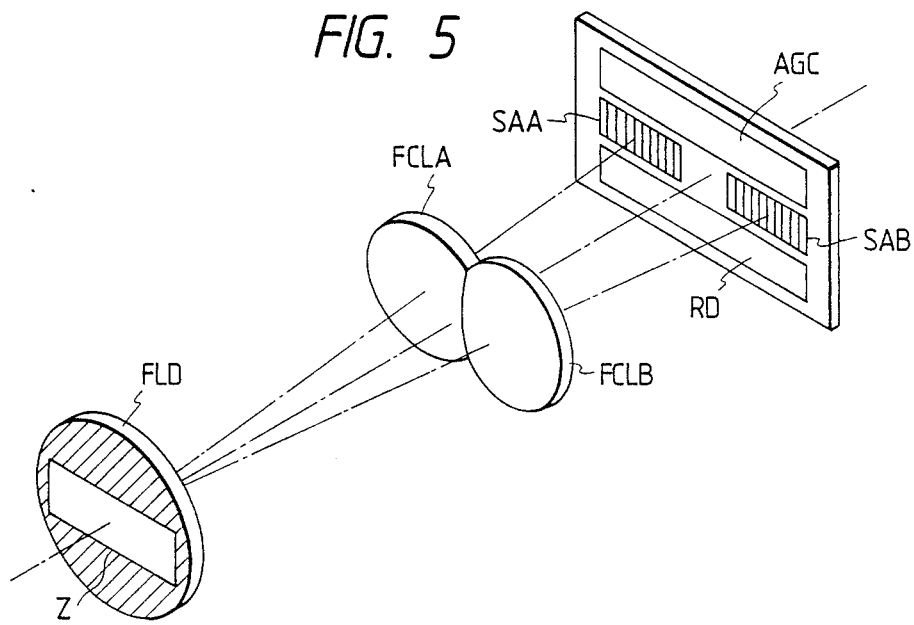
FIG. 5 shows the construction of the optical system of a focus detecting device according to the present invention.

Some embodiments of the present invention will hereinafter be described. FIG. 5 shows a focus detecting optical system of the divided pupil type using a secondary imaging and separating optical system used in a focus detecting device according to the present invention. In FIG. 5, the photo-taking lens, etc. of a camera are omitted and only the focus detecting optical system is shown. In FIG. 5, a field mask having a distance measuring field opening Z is placed near a field lens FLD, and the set of the field mask and the field lens is disposed near the predetermined imaging plane of the photo-taking lens, not shown. The image of the field Z is separated and imaged on a sensor array SAA and a sensor array SAB by a lens FCLA and a lens FCLB, respectively. An AGC circuit for controlling the accumulation time of sensors in conformity with the quantity of incident light and a read-out circuit RD for successively outputting the data of picture elements are integrated in the on-chip fashion above and below the sensor arrays SAA and SAB. The principle of operation of the sensor arrays may be any one which detects and outputs the distribution of the quantity of light on the line, such as one which assumes a CCD structure or one which assumes a MOS structure.

Figure 6:
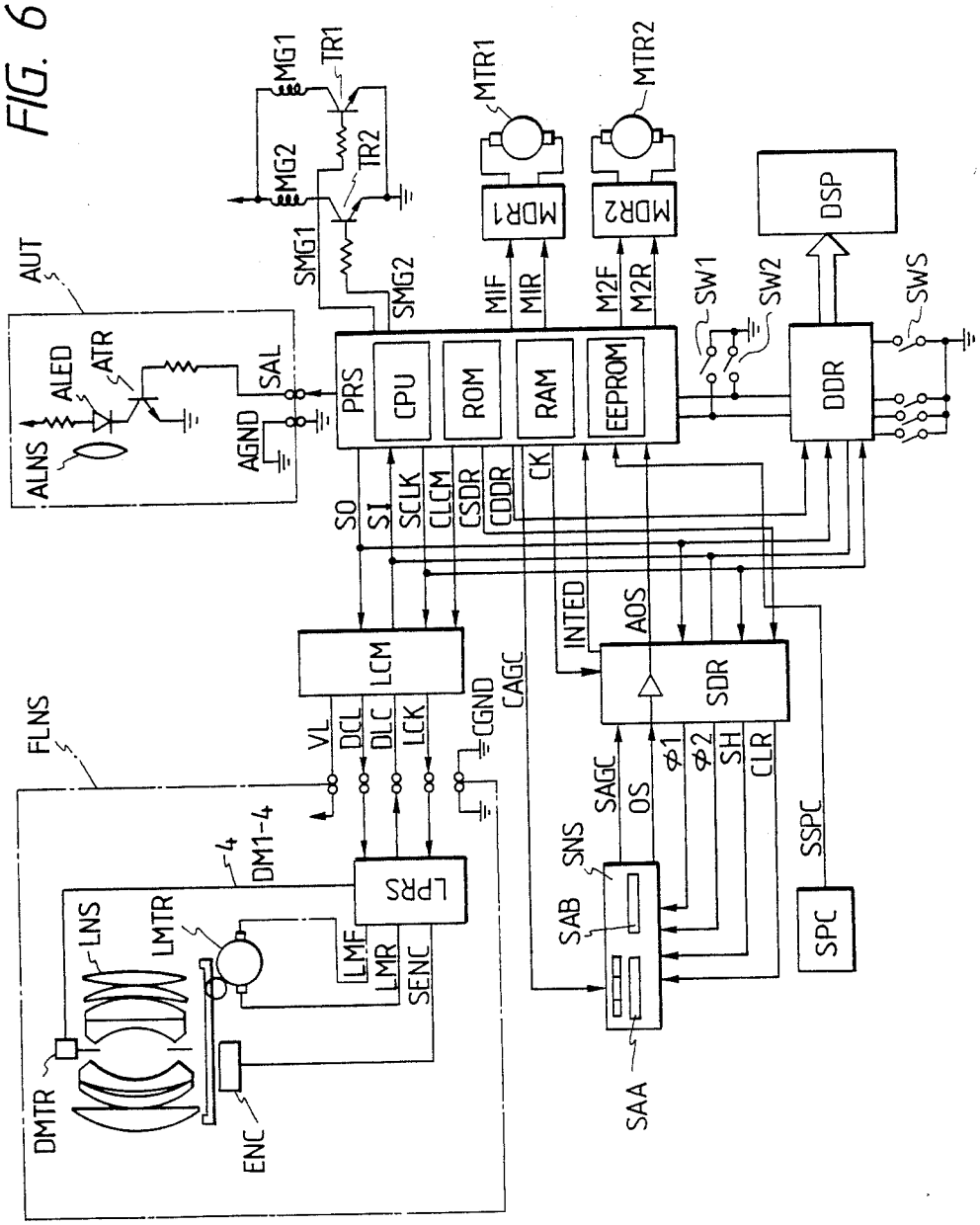
FIG. 6 is a circuit diagram showing an embodiment of the focus detecting device according to the present invention.

FIG. 6 is a circuit diagram of an embodiment of a camera provided with an automatic focus detecting device according to the present invention.

In FIG. 6, PRS designates the control device of the camera which is, for example, a one-chip microcomputer having therein a CPU (central processing unit), a ROM, a RAM and an A/D converting fucntion. The microcomputer PRS performs a series of operations of the camera such as an automatic exposure controlling function, an automatic focus adjusting function, and the winding-up and rewinding of a film, in accordance with the sequence program of the camera stored in the ROM. For those purposes, the microcomputer PRS uses signals for communication SO, SI and SCLK and communication selection signals CLCM, CSDR and CDDR to effect communications with the surrounding circuits in the camera body and the control device in the lens, thereby controlling the operations of each circuit and the lens.

SO is a data signal output from the microcomputer PRS, SI is a data signal input to the microcomputer PRS, and SCLK is a synchronizing clock signal for the signals SO and SI.

LCM designates a lens communication buffer circuit which supplies electric power to a power source terminal VL for the lens when the camera is operating, and provides a communication buffer between the camera and the lens when the selection signal CLCM from the microcomputer PRS is at a high potential level (hereinafter referred to as "H", and a low potential level will hereinafter be referred to as "L").

When the microcomputer PRS renders CLCM into "H" and supplies predetermined data from SO in synchronism with SCLK, LCM outputs the buffer signals LCK and DCL of SCLK and SO, respectively, to the lens through the communication contact between the camera and the lens. Simultaneously therewith, LCM outputs the buffer signal of a signal DLC from the lens as SI, and the microcomputer PRS receives as an input the data of the lens from SI in synchronism with SCLK.

SDR denotes a driving circuit for a line sensor device SNS for focus detection comprised of CCD or the like. The line sensor device SNS is constructed as shown in FIG. 5 and has light receiving element arrays SAA and SAB, a signal processing circuit, etc. integrated therein. The driving circuit SDR is selected when a signal CSDR is "H", and is controlled from the microcomputer PRS by the use of signals SO, SI and SCLK. A signal CK is a clock for producing CCD driving clocks $\phi 1$ and $\phi 2$, and a signal INTEND is a signal for informing the microcomputer PRS that the accumulating operation has been terminated.

The output singal OS of SNS is a time-serial image signal synchronized with the clocks $\phi 1$ and $\phi 2$, and is amplified by an amplifier circuit in the driving circuit SDR and thereafter is output as AOS to the microcomputer PRS. The microcomputer PRS receives as an input AOS from the analog input terminal thereof, converts it into a digital signal by the A/D converting function therein in synchronism with CK, and stores it at a predetermined address of the RAM.

A signal SAGC which also is the output signal of SNS is the output of an AGC (auto gain control) sensor in SNS and is input to the driving circuit SDR for use for the accumulation control of SNS.

SPC designates a photometric sensor for exposure control which receives the light from the object passed through the photo-taking lens, and the output SSPC thereof is input to the analog input terminal of the microcomputer PRS and is A/D-converted, whereafter it is used for automatic exposure control in accordance with a predetermined program. AUT denotes an auxiliary light unit which communicates with the control device PRS through a contact. SAL designates an auxiliary light emission signal, and an auxiliary light ALED is turned on when the signal SAL is at H level.

DDR designates a switch detection and display circuit which is selected when a signal CDDR is "H", and is controlled from the microcomputer PRS by the use of signals SO, SI and SCLK. That is, it changes over the display of the display member DSP of the camera on the basis of data sent from the microcomputer PRS, and informs the microcomputer PRS of the ON or OFF state of the various operating members of the camera by communication.

SW1 and SW2 denote switches operatively associated with a release button, not shown. The switch SW1 is closed by the first-stage depression of the release button, and subsequently the switch SW2 is closed by the second-stage depression of the release button. The microcomputer PRS effects photometry and automatic focus adjustment upon closing of the switch SW1, and effects exposure control and winding-up of the film with the closing of the switch SW2 as a trigger.

The switch SW2 is connected to the "interruption input terminal" of the microcomputer PRS, and even when the program during the closing of the switch SW1 is being executed, interruption is applied by the closing of the switch SW2 and immediately the control can be shifted to a predetermined interruption program.

MTR1 designates a film feeding motor, and MTR2 denotes a motor for moving the mirror up and down and charging the shutter spring. The control of the forward and reverse rotations of these motors is effected by their respective driving circuits MDR1 and MDR2. Signals M1F, M1R, M2F and M2R input from the microcomputer PRS to the driving circuits MDR1 and MDR2 are motor controlling signals.

MG1 and MG2 designate magnets for starting the movement of the shutter opening blades and the shutter closing blades, respectively. These magnets are electrically energized by signals SMG1 and SMG2 and amplification transistors TR1 and TR2, and shutter control is effected by the microcomputer PRS. The switch detection and display circuit DDR, the motor driving circuits MDR1 and MDR2 and shutter control have no direct relation with the present invention and therefore need not be described in detail.

A signal DCL input to the control circuit LPRS in the lens in synchronism with LCK is the command data from the camera to the lens FLNS, and the operation of the lens for the command is predetermined. The control circuit LPRS analyzes that command in accordance with a predetermined procedure, and effects the focus adjusting operation, the aperture controlling operation, and the outputting of the operating situations of the various portions of the lens (such as the driving situation of the focus adjusting optical system and the driven state of the stop) and various parameters (such as the full open F-number, the focal length, and the coefficient of the defocus amount vs. the amount of movement of the focus adjusting optical system) from an output DLC.

In the present embodiment, an example of a single lens is shown, and when a command for focus adjustment has been sent from the camera, a focus adjusting motor LTMR is driven by signals LMF and LMR in accordance with the amount and direction of driving sent at the same time, whereby the optical system is moved in the direction of the optic axis to thereby accomplish focus adjustment. The amount of movement of the optical system is monitored by the pulse signal SENC of an encoder circuit ENC and is counted by a counter in LPRS, and at a point of time whereat a predetermined movement has been completed, LPRS itself renders the signals LMF and LMR into "L" and brakes a motor LMTR.

Therefore, once the command for focus adjustment has been sent from the camera, the control device PRS of the camera need not at all be concerned in lens driving, until the driving of the lens is terminated. Also, the design is made such that when there is a requirement from the camera, the content of said counter can be delivered to the camera.

When a command for aperture control has been sent from the camera, a conventional stepping motor DMTR for aperture driving is driven in accordance with the number of aperture steps sent at the same time. The stepping motor is capable of open control and therefore does not require an encoder for monitoring the operation.

Before describing the operation of FIG. 6, the regularity discriminating operation of the present invention will be described.

Figure 1:
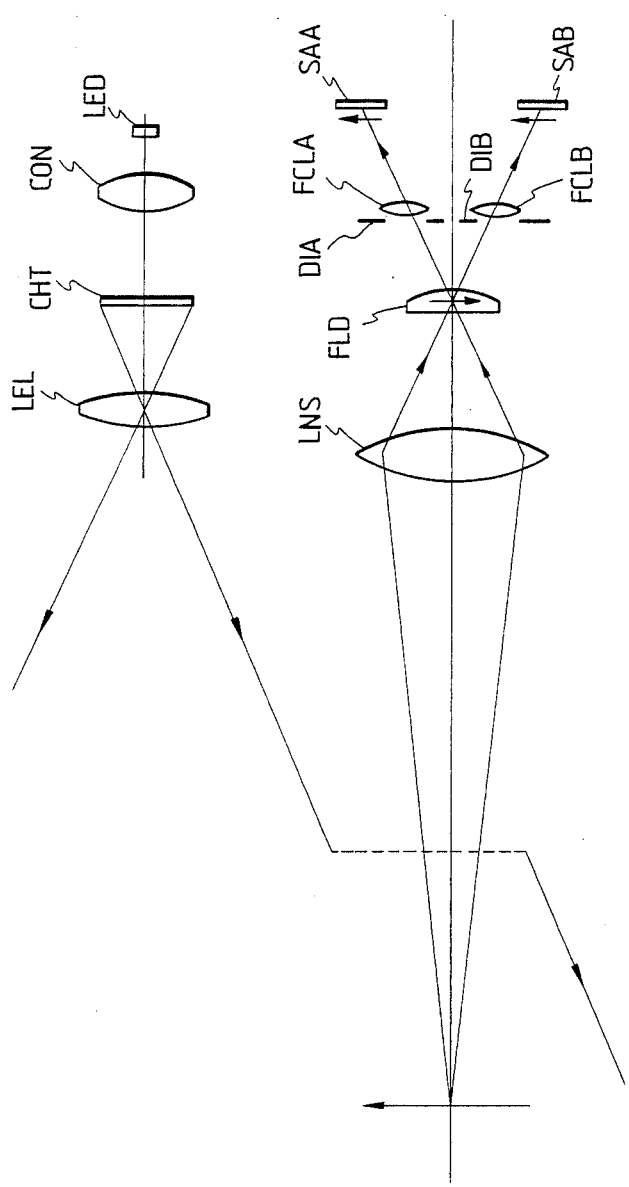
FIG. 1 shows the construction of the optical system of an automatic focus detecting device.
Figure 2:
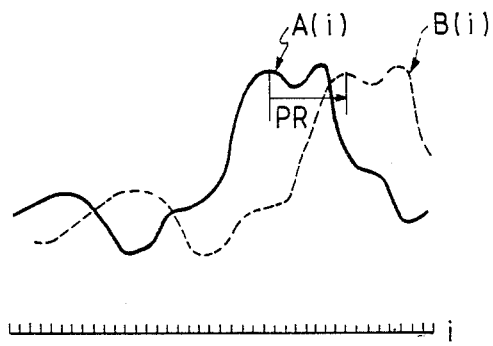
FIG. 2 illustrates image signals in sensors.
Figure 3:
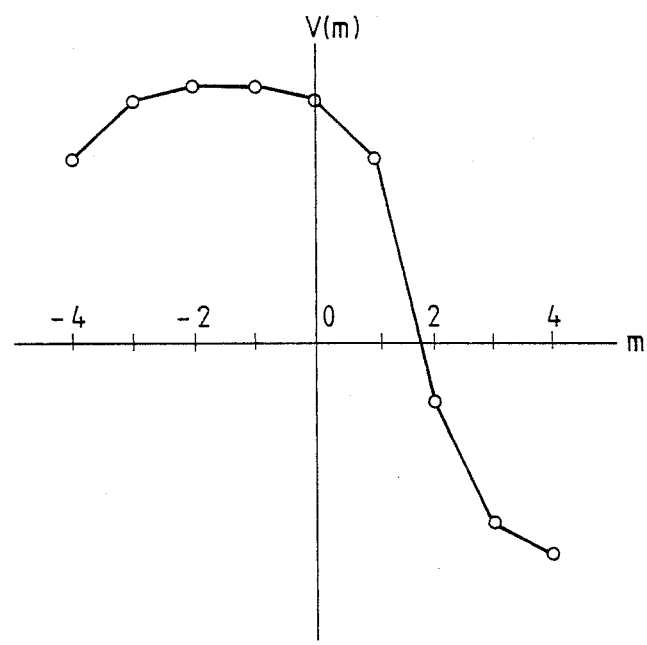
FIG. 3 illustrates the correlation amount using the focus detecting device.
Figure 4:
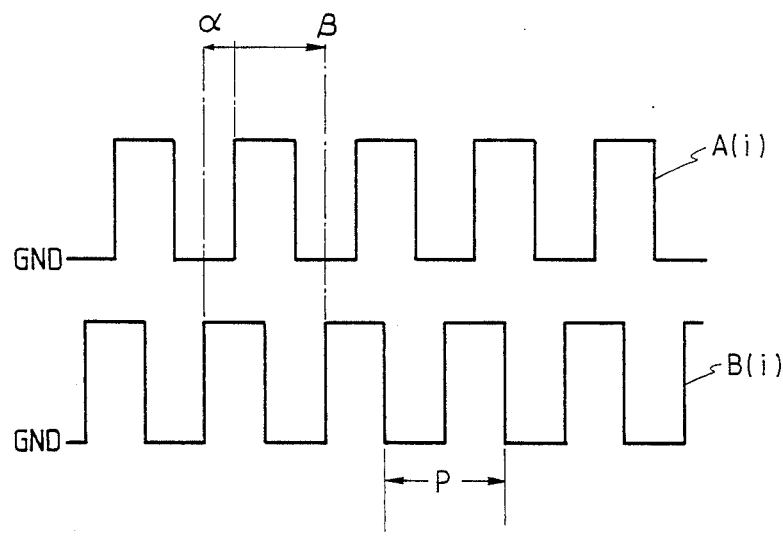
FIG. 4 illustrates image signals having regularity.
Figure 7A:
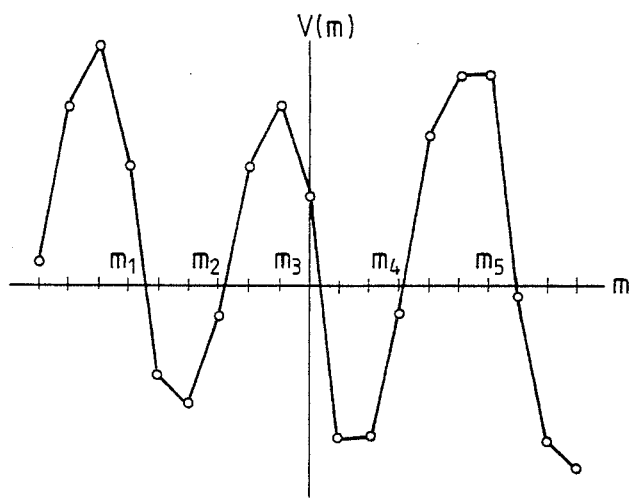
FIGS. 7A and 7B illustrate the operation of discriminating the regularity used in the focus detecting device according to the present invention.
Figure 7B:
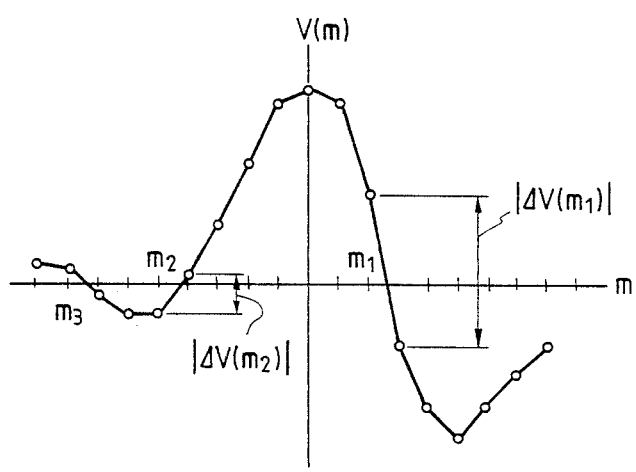

A description will first be given of a case where the regularity of the object pattern is discriminated from the result of the correlation calculation for focus detection. When (the differential form of) the correlation between two object images A(i) and B(i) is calculated on the basis of the aforementioned equation (1), V(m) as shown in FIG. 3 is obtained for an ordinary object pattern of not strong regularity, and the zero cross point corresponding to the defocus amount of the photo-taking lens can be discriminated. However, in the pattern of strong regularity as shown in FIG. 4, when V(m) is calculated, repetition appears in the manner as shown in FIG. 7A and a plurality of zero cross points appear. Assuming that the inversion of the sign of V(m) has occurred between a certain ml and $m_1+1$, the magnitude $|\Delta V(m_1)|$ of the absolute value of $$\Delta V(m_1) = V(m_1+1) - V(m_1) \quad (3)$$

represents the reliability of the zero cross point as the coincidence point of the two images, but it is the characteristic of the result of the correlation calculation for an object of regularity that the value of $|\Delta V(m)|$ appears at a different zero cross point without a great difference. That is, (i) the number of zero cross points such as $m = m_1, m_2, \ldots$ at which the sign of V(m) is inverted is plural, and (ii) $|\Delta V(m_1)| \simeq |\Delta V(m_2)| \simeq \ldots |\Delta V(m_L)|$ A plurality of zero cross points may sometimes occur even for an ordinary object of non-regularity, but as shown in FIG. 7B, $|\Delta V(m_1)| >> |\Delta V(m_2)|$, and relative to the zero cross point $m_1$ corresponding to the true coincidence point of the two images, the other zero cross points are clearly distinguished in respect of reliability.

From the above-noted fact, for example, as a method of discriminating regularity, when the zero cross point indicative of maximum $|\Delta V(m)|$ is $m_1$, it can be used as a judgment condition for a pattern of regularity that there are L or a greater number of m's for which $$|\Delta V(m_L)| > F \times |\Delta V(m_1)|, \quad (4)$$

where F is a positive constant which is $0 < F \leq 1$, and L is 1 or greater positive integer. Also, when using this judgment condition, the reliability factor $|\Delta V(m)|$ of the zero cross point may be divided by the contrast C of the object and normalized. Usually, C is $$C = MAX\{A(i)\} - MIN\{A(i)\} \quad (5a)$$

or $$C = \sum_{i=2}^{N} |A(i) - A(i-1)|, \quad (5b)$$

where $MAX\{A(i)\}$ means the maximum value of image signals $A_1, A_2, \ldots, A_N$, and $MIN\{A(i)\}$ means the minimum value of image signals $A_1, A_2, \ldots, A_n$. B(i) may be used instead of A(i), or the two image signals may be used together to calculate C.

As another judgment standard, for example, the number of zero cross points at which the sign of V(m) is more inverted may be simply counted and when this count number is a predetermined value or greater, it may be judged that the object pattern is a pattern of regularity, or the zero cross points m's may be listed in the order of the magnitude of the reliability factor $|\Delta V(m)|$ of the zero cross points and a reliability threshold value may be defined with respect to the Lth zero cross point.

Figure 8A:
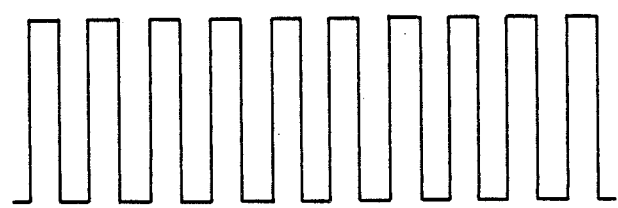
FIGS. 8A, 8B and 8C illustrate changes in an image signal during auxiliary light projection.
Figure 8B:
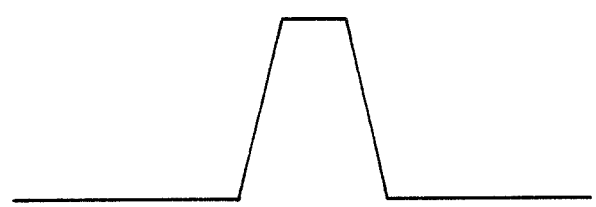
Figure 8C:
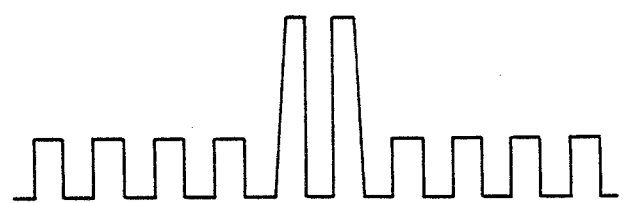

The regularity of the object pattern is discriminated by the method as disclosed above, and when it is discriminated that the regularity of the object is great, auxiliary light emitting means is caused to emit light and a pattern is projected onto the surface of the object. The distribution of the quantity of auxiliary light needs to have a pattern, and an auxiliary light having the distribution of the quantity of light shown in FIG. 8B is projected onto an object of regularity as shown, for example, in FIG. 8A, and the illumination distribution of the object is rendered into the state as shown in FIG. 8C to change the object into an object of non-regularity, whereby a shift can be made to a state in which the focus can be detected.

A description will now be given in accordance with the flow of the focus detecting device according to the present invention shown in FIG. 6.

When a power source switch, not shown, is operated, the supply of electric power to the microcomputer PRS is started, and the microcomputer PRS starts to execute the sequence program stored in the ROM.

FIG. 9A is a flow chart showing the general flow of said program.

When the execution of the program is started by said operation, at step (002), the state of the switch SW1 adapted to be closed by the first stroke of the release button is detected, and when the switch SW1 is OFF, at step (003), all flags for control set in the RAM in the microcomputer PRS are cleared. The detection of the state of the switch SW1 is accomplished by rendering the signal CDDR from the computer PRS into H and selecting the circuit DDR, and transmitting the signal SO as the detection command of the switch SW1 to the circuit DDR to thereby effect the detection of the state of the switch SW1 in the circuit DDR, and transmitting the result thereof as a signal SI to the computer PRS. The steps (002) and (003) are repetitively executed until the switch SW1 becomes ON or the power source switch becomes OFF, and by the switch SW1 becoming ON, a shift is made to step (004).

The step (004) means the sub-routine of "AE control". In this "AE control" sub-routine, a series of camera operations such as the photometric calculation process, the exposure control, the shutter charge, and the film winding up after the exposure are performed.

The "AE control" sub-routine has no direct relation with the present invention and therefore need not be described in detail, but the outline of the function of this sub-routine is as follows.

As long as the switch SW1 is ON, this "AE control" sub-routine is executed, and each time this sub-routine is executed, the mode setting of the camera, photometering, exposure control calculation and display are effected. When the switch SW2 is closed by the second stroke of the release button, not shown, the release operation is started by the interruption processing function of the microcomputer PRS, and the control of the aperture or the shutter time is effected on the basis of the exposure amount found by said exposure control operation, and after the completion of the exposure, shutter charge and film feeding operations are effected, whereby photographing by one frame of the film is executed.

Now, when the "AE control" is completed at step (004), the "AF control" sub-routine of step (005) is executed.

The flow chart of the "AF control" sub-routine is shown in FIG. 9B.

First, at step (102), the state of flag PRMV is detected. The flag PRMV, as will be described later, is a flag concerned in lens control, but as previously described, at step (003), all flags are cleared while the switch SW1 is OFF and therefore, when the "AF control" sub-routine of step (005) is called for the first time after the switch SW1 is closed, the flag PRMV also is 0 and therefore, a shift is made to step (106).

At the step (106), the state of flag AUXJF is detected. The flag AUXJF is a flag concerned in auxiliary light control, and as previously described, all flags are cleared at step (003) and the flag AUXJF also is 0 and therefore, a shift is made to step (108).

The step (108) is an "image signal input" sub-routine, and by this sub-routine being executed, the A/D-converted signals of the image signals from the sensor arrays SAA and SAB of the sensor device SNS are stored at predetermined addresses in the RAM of the microcomputer PRS. Also, at the step (108), the levels of the image signals and the contrast C defined by the equations (5a) and (5b) are calculated, and when low illumination or low contrast (C is small) is judged, flag LSIGFLG is set to 1.

At step (111), the state of flag AUXMOD is detected. The flag AUXMOD is a flag indicating that the mode is the auxiliary light mode. The control of the auxiliary light will be described later.

As previously described, at the step (003), all flags are cleared and the flag AUXMOD also is 0 and therefore, a shift is made to step (112). At the step (112), the state of the flag LSIGFLG is detected. The flag LSIGFLG is a flag set in the "image signal input" sub-routine of step (108), and is set to 1 when the object illumination is low or the contrast of the image signal is low. Here, a description will be given with it being understood that the object illumination and the contrast are both sufficient (LSIGFLG is 0). Since the flag LSIGFLG is 0, shift is made to step (113), where the auxiliary light mode flag AUXMOD is cleared because the object illumination and the contrast are sufficient.

Subsequently, at step (114), the "focus detection" sub-routine is executed.

In this sub-routine, the focus (the amount of image deviation $M_0$) of the photo-taking lens is calculated and detected from the image signal data stored in the RAM by the use of the equations (1) and (2), and if the lens is in the in-focus state, an in-focus flag JF is rendered into 1, and if focus detection is impossible due to low contrast in spite of the object being illuminated by projected auxiliary light, a focus detection impossibility flag AFNG is rendered into 1, and in the case of one of the two states, a lens driving inhibition flag VMVDI for inhibiting lens driving is set to 1 and a return is made to the main program. If the contrast is high and the photo-taking lens is not in focus, the defocus amount is found. At this time, the flag LMVDI is held at 0.

At the next step (115), regularity is discriminated. For example, whether a plurality of $|\Delta V(m)|$'s approximate to one another at the zero cross point exist for the zero cross point for $V(m)$ found by the equation (1) is discriminated by the equations (3) and (4), that is, the discrimination of the reliability of a plurality of correlative zero points, and when a plurality of points at which the two images are found to be coincident with each other exist, the flag LSIGFLG is set to 1, and the program branches off to step (131). On the other hand, when the object is judged as being not an object of regularity, an advance is made to step (116). The flag control of the step (131) and subsequent steps concerned in the auxiliary light is basically the same as step (121) and so on which will be described later.

At the next step (116), the "indication" subroutine for indicating the in-focus state or a focus detection impossibility is executed. This is displayed by the display member DSP with predetermined data communicated from the display circuit DDR, but this operation has no direct relation with the present invention and therefore need not be described any more.

Now, at the next step (117), the state of the flag LMVDI is detected. As previously described, when lens driving is not necessary, the flag LMVDI is set to 1 and therefore, if at the step (117), the flag LMVDI is 1, the "AF control" sub-routine is returned to the main program at step (118). If the flag LMVDI is 0, a shift is made to step (119), where the "lens driving" sub-routine is executed and the lens is driven in conformity with the calculated defocus amount.

If the "lens driving" sub-routine (119) is terminated, at step (120), a lens driving execution flag PRMV is set to 1, whereafter at step (130), the "AF control" sub-routine is returned to the main program.

When the "AF control" sub-routine is returned to the main program, return is made to step (002), and as long as the switch SW1 is ON, the AE control and the AF control sub-routine are repeated.

Assuming that in the main flow of FIG. 9(A), the "AF control" of step (005) is called again (for the second time), the detection of the state of the flag PRMV is effected at step (102).

In the case of the in-focus or focus detection impossibility in the last "AF control" routine, the flag PRMV is not set to 1 and therefore, the flow of step (106) and subsequent steps is again executed. If lens driving has been effected the last time, at step (120), the flag PRMV is set to 1 and therefore, a shift is made to step (103).

At the step (103), communication is effected with the lens to thereby detect the current situation of driving of the lens, and if it is notified by the lens that the predetermined driving directed at step (119) has been terminated, at step (105), the flag PRMV is set to 0, and the flow of step (106) and subsequent steps is executed. This discrimination is accomplished by a monitor signal SENC being detected by the computer PRS because during lens driving, this signal SENC is delivered from the encoder ENC. Also, if it is notified by the lens that the lens is still being driven, a shift is made to step (104), where the "AF control" sub-routine is returned to the main program.

Thus, in the "AF control" sub-routine, new focus operations and lens control are performed only in a state in which the lens is not driven.

That is, in the normal mode, as long as the switch SW1 is ON, the AE and the AF control sub-routine are repeated, and in the AF control sub-routine, the detection of the defocus amount is effected on the basis of the image signal, and if a predetermined condition is not satisfied with respect to the image signal or the calculated value, the indication of the focus detection impossibility is effected, and if judgment of the in-focus state is complete, the indication of the in-focus state is effected, and when the lens is not in focus and the defocus amount is found, lens driving by an amount corresponding to this defocus amount is effected to thereby shift the lens to the in-focus state.

The operations concerned with the auxiliary light will now be described.

If in the above-described AF control subroutine, the luminance of the object is low or the contrast of the object is low, at step (108), the flag LSIGFLG is set to 1, and if the object is an object of regularity, at step (115), the flag LSIGFLG is set to 1, and upon the detection of the state of the flag LSIGFLG at step (112), a shift is made to step (121).

At the step (121), the mounted state of the auxiliary light unit AUT is detected, and if the unit AUT is not mounted, a shift is made to step (113), where the same operation as the ordinary operation described hitherto is performed. If the unit is mounted, a shift is made to step (122), where an auxiliary light mode flag AUXMOD is set to 1. Where the auxiliary light unit AUT is contained in the camera body, the step (121) may be omitted.

Subsequently, at step (123), the state of a flag AUXUSE is detected. The flag AUXUSE is a flag adapted to be set to 1 when actually the auxiliary light projection has been done (with the flag AUXMOD set to 1), that is, when the "image signal input" sub-routine of step (108) is executed. In the situation now under discussion, the mode has become the auxiliary light mode for the first time and therefore, before that, the auxiliary light projection is not done and at step (124), the "AF control" is returned to the main program. That is, in this case, the image signal data input at step (108) is abandoned, and in the next "AF control", the image signal is input with the auxiliary light being projected, and this is used for focus detection.

Now, with the flag AUXMOD set to 1 for the first time at step (122), the "AF control" is returned to the main program, whereafter if the "AF control" sub-routine is again called in the manner described above, the image signal is input in the "image signal input" sub-routine of step (108) with the auxiliary light being projected, and upon the detection of the state of the auxiliary light mode flag AUXMOD at step (111), a shift is made to step (121).

In the "image signal input" sub-routine, the flag AUXMOD is set to 1 and therefore, when accumulating the image signal, SAL is rendered into H level and the auxiliary light ALED is turned on.

At step (123) via steps (121) and (122), the detection of the state of the auxiliary light use flag AUXUSE is effected. At step (108), the "image signal input" sub-routine has already been executed with the auxiliary light being projected and the flag AUXUSE is set to 1 and therefore a shift is made to step (114), where the "focus detection" sub-routine is executed. The subsequent steps are similar to the normal AF control.

Also, when the regularity of repetition has been detected at step (115), steps (131), (132) and (134) are executed in the same manner as steps (121), (122) and (123) under the above-described low contrast detection and the "AF control" is returned to the main program, and when the "AF control" is again called thereafter, step (114) is executed through steps (108), (111), (121), (122) and (123) in the same manner as in the above-described auxiliary light mode. Consequently, even when the regularity of repetition is judged as being high, the AF control operation under the projected auxiliary light is performed in the same manner as during low contrast.

As described above, under the condition of low luminance, low contrast or an object of regularity and when the auxiliary light unit has been mounted, the mode becomes the auxiliary light mode, and the focus adjusting operation is performed on the basis of the detected image signal under the emitted auxiliary light, but when the lens has become in focus with the auxiliary light being projected, an auxiliary light in-focus flag AUXJF is set to 1 in the "focus detection" sub-routine of step (114), and in this case, in the flow of the "AF control", the state of the flag AUXJF is detected at step (106) and a shift is made to step (107), whereafter the "AF control" sub-routine is returned to the main program. That is, when the lens has become in focus with the auxiliary light being projected, the focus adjusting operation and lens driving are not effected until the switch SW1 is opened.

Figure 10:
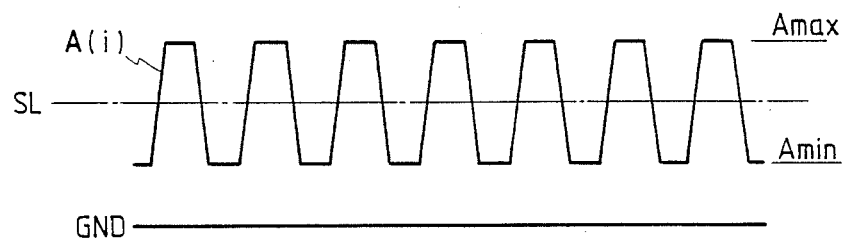
FIG. 10 illustrates another example of the discrimination of regularity.

FIG. 10 illustrates another example of the discrimination of regularity. When there is the object image signal A(i) or B(i) as shown in FIG. 10, the maximum value Amax and the minimum value Amin thereof are found, and a slice level SL is set intermediately thereof.

$$SL = (A_{max} + A_{min})/2 \quad (6)$$

If the object is a pattern of regularity, the magnitude relation of the image signal $A(i)$ to the slice level varies periodically depending on i.

This phenomenon can be easily detected because it may be observed with attention paid only to the sign of $(A(i)-SL)$, and when the number of alternate periodical inversions of the sign exceeds a predetermined number, the object pattern can be judged as an object pattern of strong regularity. The slice level may also be set as the average value $(\overset{N}{\Sigma}A(i)/N$ of the entire field of $A(i)$. Also, a gentle illumination distribution often exists in superposed relationship with the regularity pattern of the object and therefore, if the slice level is made into a localized image signal average value and is varied with i, still better discrimination can be accomplished. That is, $$SL(i) = \sum_{l=-J}^{J} A(i+l)/(2J+1), \quad (7)$$

where J is a suitable positive integer which is chosen so that the smoothing width $(2J+1)$ is sufficiently greater than the pitch of the regularity pattern in question.

The above-described method only detects that the fluctuation of $A(i)$ is vehement, and does not detect the regularity of the fluctuation. As a purpose of the present invention, a periodical discrimination signal may be put out for the aggregate of a little greater image signals including an object of regularity and therefore, the present method is sufficiently practical with the exception that there are some cases where auxiliary light emission is effected for an object which does not require the light emission.

Where the regularity is discriminated directly from the fluctuation of the image signal by the use of the above-mentioned equations (6) and (7), the discrimination can be practically used short of the focus detection calculation and therefore, ineffective calculations will become less frequent. That is, in the flow chart of FIG. 9, the sub-routine for discriminating the regularity of the image signal by the use of the equations (6) and (7) is inserted between the image signal inputting of step (108) and the detection of the set state of the flag LSIGFLG at step (112), and if the object is judged as being an object of regularity, the flag LSIGFLG is set to 1, and a flow in which the program branches off from step (112) to step (121) is provided. At this time, the step of FIG. 9(b) and step (131) and subsequent steps can be omitted.

Figure 11A:
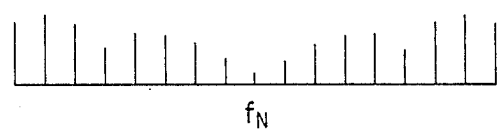
FIGS. 11 and 11B illustrate still another example of the discrimination of regularity.
Figure 11B:
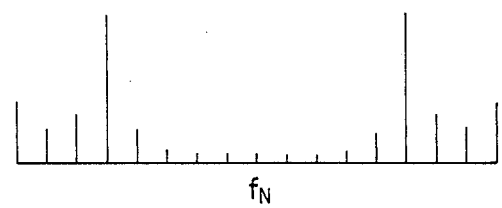
Figure 12A:
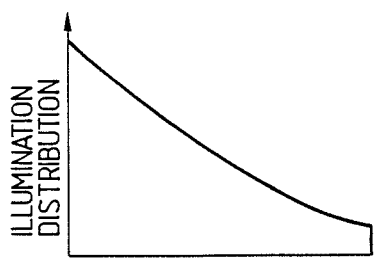
FIGS. 12A to 12D illustrate the illumination distributions of various objects.
Figure 12B:
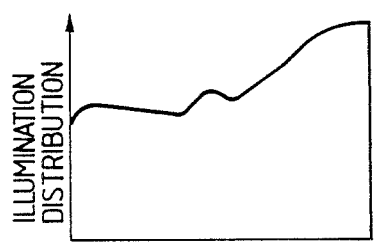
Figure 12C:
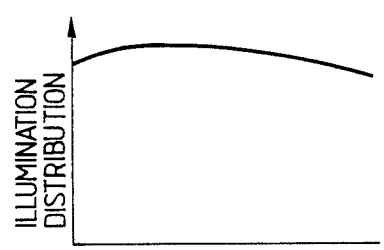
Figure 12D:
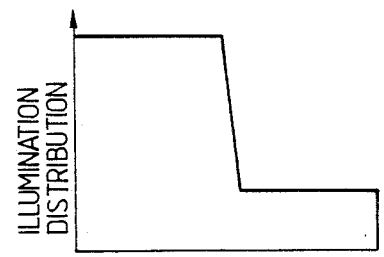

A method using digital Fourier conversion may be adopted as another method of regularity discimination. When the power spectrum of the digital Fourier conversion of the image signal luminance distribution is calculated, there is obtained a gentle power spectrum free of very vehement fluctuation for an object of non-regularity, as shown in FIG. 11(A). In FIG. 11(A), the horizontal axis represents the spatial frequency, and $f_N$ is the nyquist frequency. However, in a pattern of regularity, a strong peak is seen at a particular spatial frequency as shown in FIG. 11(B), and is clearly distinguished from a pattern of non-regularity. Accordingly, the ratio of the particular spectrum to the sum of all power spectra is found, and of the value thereof exceeds a predetermined value, the object can be judged as an object of regularity. Specifically, when the power spectrum component of the image signal $$A(i) \ (i = 1, 2, \ldots, N) \text{ is } A^{\sim 2}(i) \ (i = 1, 2, \ldots, N), \quad (8)$$

$$\gamma_i = A^{\sim 2}(i) / \sum_{i=1}^{N} A^{\sim 2}(i)$$

is found, and if there is i which satisfies $\gamma_i > R$, the object is determined as an object of regularity. R is $0 < R < 1$, and is a predetermined constant. Also, if up to the Jth $A^{\sim 2}(i)$ greater from $A^{\sim 2}(i)$ are added and it is judged that the regularity is strong when the sum thereof exceeds a threshold value R, a more reliable operation can be accomplished.

The power spectrum referred to in the present embodiment is the square sum of Fourier sine conversion and cosine conversion.

Also, the equation (8) can be modified into $$\gamma_i = A^{\sim 2}(i) / \sum_{i=1}^{N} A(i)^2 \quad (9)$$

by Persval's theorem and therefore, it is not necessary to calculate the power spectrum $A^{\sim 2}(i)$ with respect to every i. In the high-speed Fourier conversion, the spectral components can be found from all i's at a time, but since the number N of picture elements is not always great and the condition of $N = 2k$ (k being an integer) is not always satisfied, the high-speed conversion algorithm cannot be said to be advantageous. It is relatively easy to calculate the power spectrum with respect to a few i's, and it is also possible to roughly infer the i which should be spectrum-calculated by the calculation in the real space. Even if calculation is effected directly from the image signal or digital Fourier conversion is effected, the position of the sub-routine occupied in the flow chart will not change.

Figure 13:
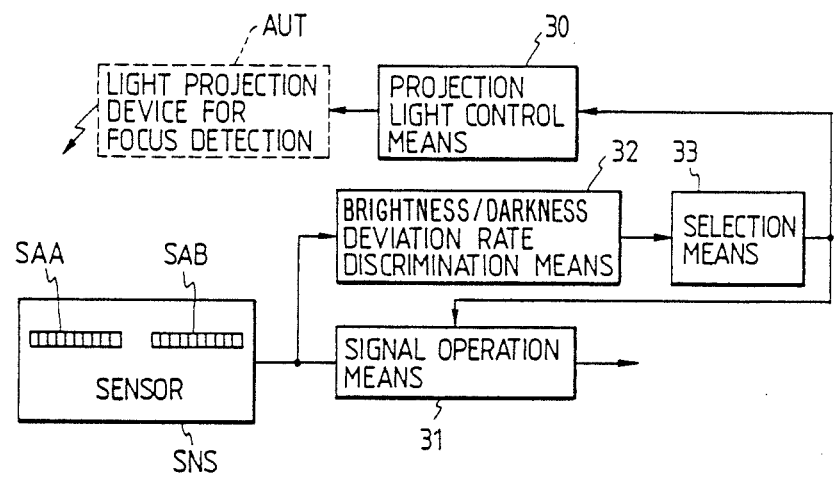
FIG. 13 is a block diagram showing another embodiment of the present invention.

FIG. 13 is a block diagram showing another embodiment of the present invention. In the figure, a light projection device AUT for focus detection is used in combination with the focus detecting device, and is of a construction similar to the auxiliary light unit AUT of FIG. 6, and projects onto an object a projection light flux for focus detection having a spatial distribution of illumination on the object surface in accordance with a command from the projection light control means 30 of the focus detecting device. Signal operation means 31 detects the focus state by the use of photoelectric conversion element arrays SAA and SAB, brightness/darkness deviation rate discrimination means 32 calculates and discriminates the brightness/darkness deviation rate of the brightness/darkness pattern of the object surface from the outputs of the photoelectric conversion element arrays SAA and SAB during the non-projection of the projection light flux for focus detection, and selection means 33 selects the outputs of the photoelectric conversion element arrays SAA and SAB during the projection of the light flux for focus detection so as to be used in the focus detection by the signal operation means 31 when it is discriminated by the brightness/darkness deviation rate discrimination means 32 that the brightness/darkness deviation rate is below a predetermined standard. Of the blocks shown in FIG. 13, the blocks other than the light projection device AUT for focus detection constitute the focus detecting device.

When AF control is executed by the first stroke of the release button, image signals are first obtained from the photoelectric conversion element arrays SAA and SAB with the light projection device AUT for focus detection being not operated. From these image signals, the brightness/darkness deviation rate discrimination means 32 calculates the brightness/darkness deviation rate by a method which will be described later, and discriminates it. If this brightness/darkness deviation rate is over the predetermined standard, the determiner means 33 selects that the image signal obtained during the non-projection of light is used by the signal operation means 31 and focus detection is effected. If the brightness/darkness deviation rate is below the predetermined standard, the selection means 33 operates the projection light control means 30 so that the light projection device AUT for focus detection projects a projection light flux for focus detection onto the object. The signal operation means 31 effects focus detection by the use of the image signals output from the photoelectric conversion element arrays SAA and SAB during the light projection.

The methods of calculating and discriminating the brightness/darkness deviation rate by the brightness/darkness deviation rate discrimination means 32 will now be described in detail.

One of the methods is to calculate the brightness/darkness deviation rate of the object pattern from the differential of the image signal A(i) or B(i) output from the photoelectric conversion element array SAA or SAB. That is, if written in terms of A(i), the sequence of numbers that $$S(i) = |A(i) - A(i-1)| \tag{10}$$

is supposed, and a sequence of numbers in which the differentials S(i) are re-arranged in the order of magnitude is defined as $\bar{S}(i)$. If $$\bar{S}(L) < F_1 \tag{11}$$

is established when the sequence of numbers $\bar{S}(i)$ is chosen up to the Lth one in the order of magnitude, it is discriminated that the brightness/darkness deviation rate is gentle. Here, L is an integer which is $L \geq 1$, and $L < 1V =$ number of picture elements, and $F_1$ is a predetermined constant. The reason why the Lth one in the order of magnitude is chosen is that there is the possibility that the first one is noise. To accomplish more stable discrimination, it is desirable to take the sum of up to the Lth one of the sequence of number $\bar{S}(i)$ in the order of magnitude and define $$\sum_{i=1}^{L} \bar{S}(i) < F_2 \tag{12}$$

as the discimination condition, and discriminate that the brightness/darkness deviation rate is gentle if the expression (12) is established. If processing is thus made in the form of a sum, the effect of phase-in-and-out can be mitigated and therefore, the stability of the operation is improved and the result will not be fluctuated by a minute change in the positions of the photoelectric conversion element arrays and the imaged position of the optical image of the object. The above-mentioned expressions (11) and (12), if normalized by the peak level Amax of the image signal A(i), will not be affected by the luminance of the object and the photoelectric charge accumulation time, and this is more desirable.

That is, for the sequence of numbers $\tilde{S}_0(i)$ which is $\tilde{S}_0(i) = \bar{S}(i)/A\text{max}$, the following is defined:

$$\tilde{S}_0(L) < F_{10} \tag{13a}$$

$$\sum_{i=1}^{L} \tilde{S}_0(i) < F_{20} \tag{13b}$$

In the present brightness/darkness deviation rate discrimination method, it is not always necessary to distinguish between an object of a low brightness/darkness deviate rate and an object of low contrast. Generally, the latter is often included in the former. However, if one dares to distinguish between the two, in the expressions (13a) and (13b), not Amax, but the absolute amount C of the change in the brightness and darkness defined by the equations (5a) and (5b) may be used as the normalization factor of the sequence of numbers $\tilde{S}_0(i)$.

An example in which the signal processing of the above-mentioned expressions (10) to (11) has been effected for an edge pattern and a gentle brightness/darkness deviation pattern is shown in FIG. 14. From this figure, the discrimination ability for the brightness/darkness deviation rates of patterns is apparent.

The numerical processing disclosed in the expressions (10) to (13) is very easy, and is of such a degree that it can be processed, for example, within the A/D conversion wait time for the picture element data to be read next if use is made of the ability of the microcomputer carried in the camera. That is, it provides no substantial load as viewed from the whole of the focus detection calculation.

When the brightness/darkness deviation rate of the object pattern has been calculated and discriminated by the method as described above and it has been discriminated that the brightness/darkness deviation rate is gentle, the light projection device AUT for focus detection is operated to thereby project a projection light flux for focus detection having a spatial distribution of illumination on the object surface. The projection light flux for focus detection needs to have a spatial distribution of illumination on the object surface, i.e., a pattern, and a projection light flux for focus detection which uniformly illuminates the object surface is not suitable.

Figure 15A:
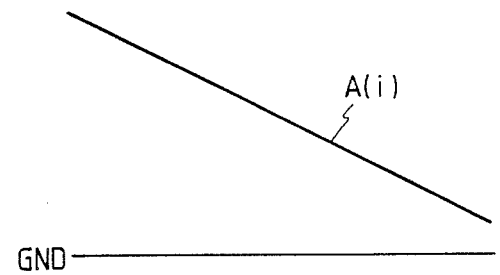
FIGS. 15A to 15C illustrate the image signals during the light projection of light projection means for focus detection according to the embodiment of FIG. 13.
Figure 15B:
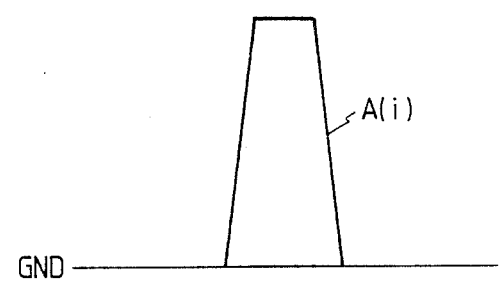
Figure 15C:
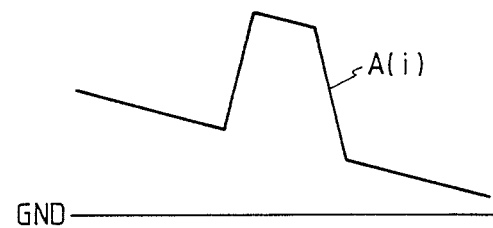

When a projection light flux for focus detection having a distribution of quantity of light as shown in FIG. 15B is projected onto an object surface of a gentle brightness/darkness deviation rate as shown in FIG. 15A, the illumination distribution of the object becomes such as shown in FIG. 15C and the object changes to an object having an edge portion of a great brightness/darkness deviation rate. It owes to the contribution of the natural light that there is object illumination even where the projection light flux for focus detection is absent. In such a case, the pattern produced by the natural light is not very effective for the focus detecting operation and therefore, the presence of the natural light eliminating function would be still more convenient when the dynamic range of the photoelectric conversion elements, the signal processing system, etc. is low. Since the present invention is based on the above-described principle, it is not possible to effectively enhance the brightness/darkness deviation rate by a projection light flux for focus detection which uniformly illuminates the object.

Another example of the calculation discrimination method by the brightness/darkness deviation rate discrimination means 32 is to calculate the brightness/darkness deviation rate of the object pattern from the square sum of the differentials between image signals. Taking the image signal A(i), $$Q = \sum_i S(i)^2 \quad (14)$$
$$= \sum_i |A(i) - A(i-1)|^2$$

is calculated, and a threshold value with respect to the value Q is provided, and the brightness/darkness deviation rate is discriminated by the comparison of the value Q with the threshold value. The range of the sum may be the whole range i=2, 3, ..., N in which data exist, or S(i) may be re-arranged in the order of magnitude and the square sum of up to the Lth S(i) from the greatest may be taken. The present method is based on the idea that even if the data is not particularly examined, a relatively great weight is naturally applied to the pair of adjacent picture elements each having a great absolute value of differential by squaring and therefore, it is desirable to simply take the sum.

The process in which the value Q defined by the equation (14) above is calculated is shown in FIG. 16. The object pattern shown as an example is the same as that shown in FIG. 14. In FIG. 16, the vertical axis represents any scale and is expanded and contracted so as to be readily seen in each step of calculation, but FIGS. 16A and 16B are made common to each other. The value Q of the present method is to finally calculate the area under the graph of $S(i)^2$ (the portion indicated by hatching), and a threshold value is provided for the area value, and if the area is below the threshold value, it is discriminated that the brightness/darkness deviation rate is gentle. The discrimination ability is apparent from FIG. 16.

If the value Q of the equation (14) is standardized by the square $A_{max}^2$ of the maximum value of the image signal, a stable operation which is not affected by the illumination of the object and the photoelectric charge accumulation time will be made possible, and this is more desirable. In any case, when the value Q is below a preset threshold value, the light projection device AUT for focus detection is operated and focus detection calculation is effected on the basis of the received light signal during light projection.

According to the embodiment described above, if the projection light flux for focus detection is within an effective distance, focus detection becomes possible even in the case of an object of a pattern in which the change in brightness and darkness is gentle, and the accuracy of focus detection is remarkably improved. In addition, the brightness/darkness deviation rate discrimination means 32 can be constructed of simple software and therefore can be provided in a microcomputer carried in the standard fashion in an auto focus camera, and can be easily realized. Further, the projection light flux for focus detection is projected when it is discriminated that the brightness/darkness deviation rate is below a predetermined standard and therefore, the light projection can be minimized, and this is advantageous in respect of power consumption.

In the above-described embodiment, there has been provided a sequence in which the brightness/darkness deviation rate is discriminated by the use of the image signal formed in the state free of the projection light flux for focus detection and a projection light flux for focus detection having a spatial distribution of the illumination on the object surface is projected onto an object whose brightness/darkness deviation rate has been discriminated as gentle, to thereby form the image signal again. However, adoption may be made of a sequence in which the image signals during the projection and the non-projection of the projection light flux for focus detection are obtained and selected.

Figure 17:
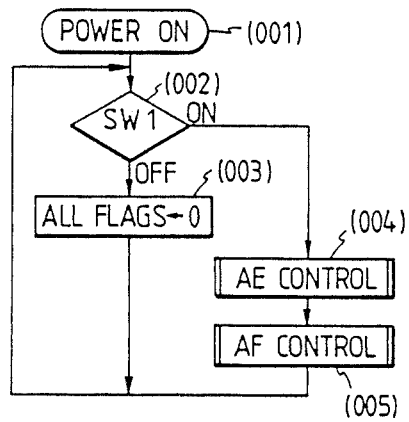
FIGS. 17 and 18 are program charts for illustrating the operation of the FIG. 13 embodiment.
Figure 18:
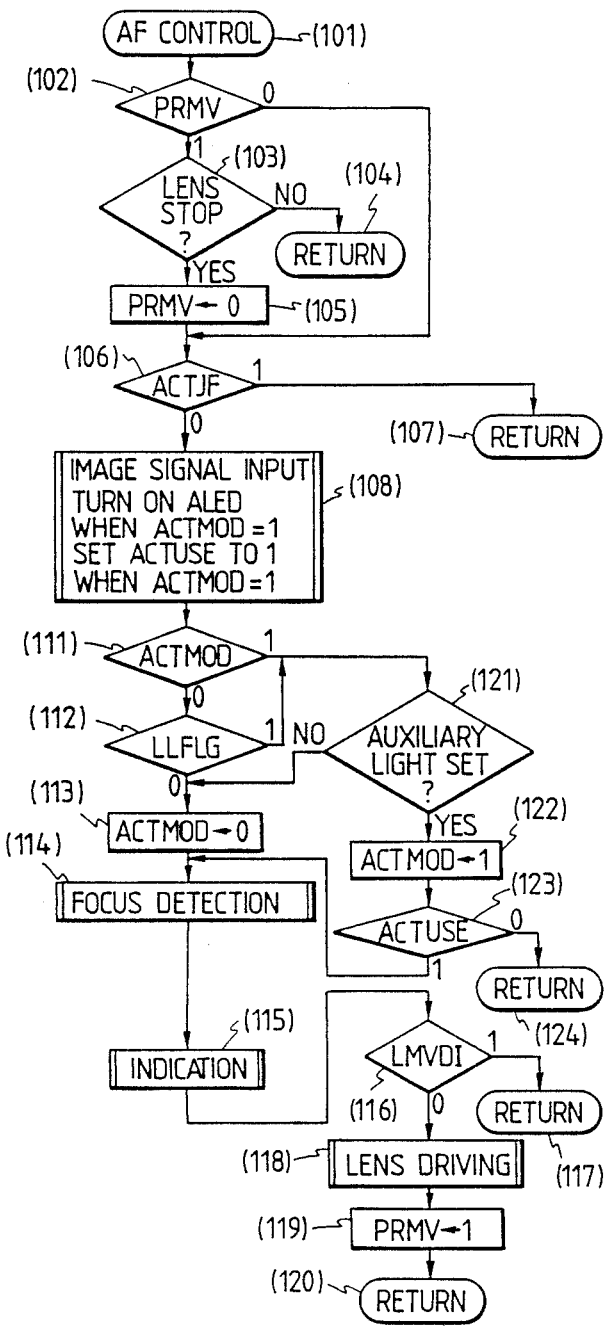

The circuit shown in FIG. 6 is used as the specific circuit construction of FIG. 13. FIGS. 17 and 18 are program flow charts illustrating the operation of the present embodiment described in connection with FIG. 13 by the use of the circuit shown in FIG. 6.

The operation of the camera in the FIG. 13 embodiment shown in FIG. 6 will hereinafter be described with reference to the flow chart of FIG. 17.

When at step 001, a power source switch, not shown, is operated, the supply of electric power to the camera control device PRS is started and the camera control device PRS executes the sequence program stored in the memory ROM. When the execution of the sequence program is started, at step 002, the state of the first stroke switch SW1 adapted to be closed by the first stroke of the release button is detected, and if the switch SW1 is OFF, at step 003, all flags for control set in the memory RAM in the camera control device PRS are cleared. The detection of the state of the first stroke switch SW1 is accomplished by rendering the communication selection signal CDDR from the camera control device PRS into a high level, selecting the switch detection and display circuit DDR, transmitting the data signal SO as the state detection command of the first stroke switch SW1 to the switch detection and display circuit DDR to thereby effect the detection of the state of the first stroke switch SW1 by the switch detection and display circuit DDR, and transmitting the result thereof as a data signal S1 to the camera control device PRS. The steps 002 and 003 are repetitively executed until the first stroke switch SW1 is closed or the power source switch is opened, and by the first stroke switch SW1 being closed, a shift is made to step 004.

The step 004 means the "AE control" sub-routine. In this "AE control" sub-routine, a series of camera operations such as photometry calculation processes, exposure control and shutter charge and film winding-up after exposure are performed. The "AE control" sub-routine has no direct relation with the present invention and therefore need not be described in detail, but the outline of the function of this sub-routine is as follows.

When the first stroke switch SW1 is ON, the "AE control" sub-routine is executed, and each time it is executed, the camera mode setting, photometering, exposure control calculation and display are effected. When the second stroke switch SW2 is closed by the second stroke of the release button, not shown, the release operation is started by the interruption processing function of the camera control device PRS, and the aperture or the shutter time is controlled on the basis of the exposure amount found by said exposure control calculation, and after the exposure control, shutter charging and film feeding operations are performed, whereby photographing by one frame of the film is executed.

When at step 004, the "AE control" is terminated, the "AF control" sub-routine of step 005 is executed. The flow chart of the "AF control" sub-routine is shown in FIG. 18.

First, at step 102, the state of flag PRMV is detected. The flag PRMV, as will be described later, is a flag concerned in lens control, but as previously described, all flags are cleared at step 003 as long as the first stroke switch SW1 is OFF and therefore, when the "AF control" sub-routine of the step 005 is called for the first time after the closing of the first stroke switch SW1, the flag PRMV also is 0, and a shift is made to step 106.

At the step 106, the state of flag ACTJF is detected. The flag ACTJF is a flag concerned in the light projection control for focus detection, and as previously described, the flag ACTJF also is 0 and therefore, a shift is made to step 108. The step 108 is the "image signal input" sub-routine, and by this subroutine being executed, the digital signal of the image signal AOS from the sensor device SNS is stored in a predetermined address on the memory RAM for data in the camera control device PRS. Also, in this sub-routine, the expressions (10) and (11) or (12) or (13a) or (13b) are calculated, whereby the magnitude of the brightness/darkness deviation rate is discriminated.

At step 111, the state of flag ACTMOD is detected. The flag ACTMOD is a flag representing that the mode is the light projection mode for focus detection. The control of the light projection for focus detection will be described later.

Since the flag ACTMOD also is 0 as previously described, shift is made to step 112. At the step 112, the state of flag LLFLG is detected. The flag LLFLG is a flag set in the "image signal input" sub-routine of step 108, and is set to 1 when the luminance of the object is low or when the brightness/darkness deviation rate defined by the expressions (11)–(13) is discriminated as being low as a result of the discrimination of the magnitude of said deviation rate. Here, the description will progress with it being assumed that the luminance of the object and the brightness/darkness deviation rate are sufficient (LLFLG=0). Since the flag LLFLG is 0, a shift is made to step 113, where the flag ACTMOD of the light projection mode for focus detection is cleared because the luminance of the object and the brightness/darkness deviation rate are sufficient.

At the next step 114, the "focus detection" sub-routine is executed. In this sub-routine, the focus state of the lens is calculated from the image signal stored in the memory RAM for data by the use of the aforementioned equations (1) and (2), and if the lens is in the in-focus state, the focusing flag JF is rendered into 1, and if the object is of low contrast and therefore focus detection is impossible, a focus detection impossibility flag AFNG is rendered into 1, and in the case of one of said two states, a lens driving inhibition flag LMVDI for inhibiting lens driving is set to 1 and a return is made to the main program. Also, if the contrast is high and the lens is not in focus, the defocus amount is found. At this time, the lens driving inhibition flag LMVDI is held at 0.

At the next step 115, the "indication" subroutine for indicating the in-focus or the impossibility of focus detection is executed. This is indicated by the display device DSP with predetermined data communicated with the switch detection and display circuit DDR, but this operation has no direct relation with the present invention and therefore need not be described any more.

At the next step 116, the state of the lens driving inhibition flag LMVDI is detected. As previously described, when lens driving is not necessary, the lens driving inhibition flag LMVDI is set to 1 and therefore, if it is 1, at step 117, a return is made to the main routine. If it is 0, a shift is made to step 118, where the "lens driving" sub-routine is executed. When the "lens driving" sub-routine is terminated, at step 119, a lens driving execution flag PRMV is set to 1, whereafter at step 120, a return is made to the main routine. When a return is made to the step 002 of the main routine of FIG. 17, the "AE control" and "AF control" sub-routines are repeated as long as the first stroke switch SW1 is ON.

Assuming that in the main routine of FIG. 17, the "AF control" sub-routine of step 005 has been called again (for the second time), at step 102, the state of the lens driving execution flag PRMV is detected. If the lens has been in focus or focus detection has been impossible in the last "AF control" sub-routine, the flow of step 106 and subsequent steps is again executed because the lens driving execution flag PRMV is 0. When lens driving has been effected at the last time, a shift is made to step 103 because the lens driving execution flag PRMV is set to 1. At the step 103, communication is effected with the control circuit LPRS in the lens and the current driving situation of the lens is detected, and if it is modified from the lens side that the predetermined driving commanded at step 118 has been terminated, at step 105, the lens driving execution flag PRMV is rendered into 0, and the flow of step 106 and subsequent steps is executed. This discrimination is accomplished by the camera control device PRS detecting the pulse signal SENC from the encoder circuit ENC. Also, if it is modified from the lens side that lens driving is still going on, a shift is made to step 104 and a return is made to the step 002 of the main routine. Thus, in the "AF control" sub-routine, a new focus detecting operation and lens control are performed only in a state in which the lens is not driven.

The operations concerned with the light projection for focus detection will now be described.

If the luminance of the object or the brightness/darkness deviation rate is low in the "AF control" sub-routine, at step 108, the flag LLFLG is set to 1, and by the detection of the state of the flag LLFLG at step 112, a shift is made to step 121. At the step 121, the state of the mounting member for the light projection device AUT for focus detection is detected, and if this device is not mounted, a shift is made to step 113, where the same operation as the aforedescribed ordinary operation is performed. If said device is mounted, a shift is made to step 122, where the light projection mode flag ACTMOD for focus detection is set to 1. Where the light projection device AUT for focus detection is contained in the camera body, the step 121 is omitted.

Subsequently, at step 123, the state of a light projection use flag ACTUSE is detected. The light projection use flag ACTUSE is a flag adapted to be set to 1 when the "image signal input" sub-routine of step 108 is executed when light projection has been actually done (with the light projection mode flag ACTMOD for focus detection being set to 1). In the situation now under discussion, the light projection mode for focus detection has been brought about for the first time and therefore, before that, light projection has not been done, and at step 124 a return to the main program is once made. That is, in this case, the image signal data input at step 108 is abandoned, and in the next "AF control" sub-routine, an image signal is input with light being projected, and this is used for focus detection.

When at step 122, the "AF control" sub-routine is again called with the light projection mode flag ACTMOD for focus detection being set to 1 for the first time, in the "image signal input" sub-routine of step 108, SAL is rendered into H level and the auxiliary light ALED is turned on and an image signal is input with light being projected, and by the detection of the state of the light projection mode flag ACTMOD for focus detection at step 111 a shift is made to step 121. If in the meantime, the light projection device AUT for focus detection is not dismounted, a shift is made to step 122. If the light projection device AUT for focus detection is dismounted, a shift is made to step 113, where the light projection mode flag ACTMOD for focus detection is rendered into 0, and the light projection mode for focus detection is cancelled and a return is made to the ordinary "AF control" sub-routine.

Via steps 121 and 122, at step 123, the state of the light projection use flag ACTUSE is detected. At step 108, this flag has already been set to 1 and therefore, a shift is made to step 114, where the "focus detection" sub-routine is executed. The subsequent steps are similar to the ordinary "AF control" sub-routine.

As described above, when the object is an object of low luminance or an object of small brightness/darkness deviation and the light projection device AUT for focus detection has been mounted, the mode becomes the light projection mode for focus detection and the focus detecting operation is performed on the basis of the image signal under light projection, and when the lens has become in focus with light being projected, the in-focus flag ACTJF is set to 1 in the "focus detection" sub-routine of step 114 and therefore, a shift is made from step 106 to step 107, and a return is made to the main routine. That is, when the lens becomes in focus with light being projected, the focus detecting operation and lens driving are not again performed until the first stroke switch SW1 is opened.

Figure 20:
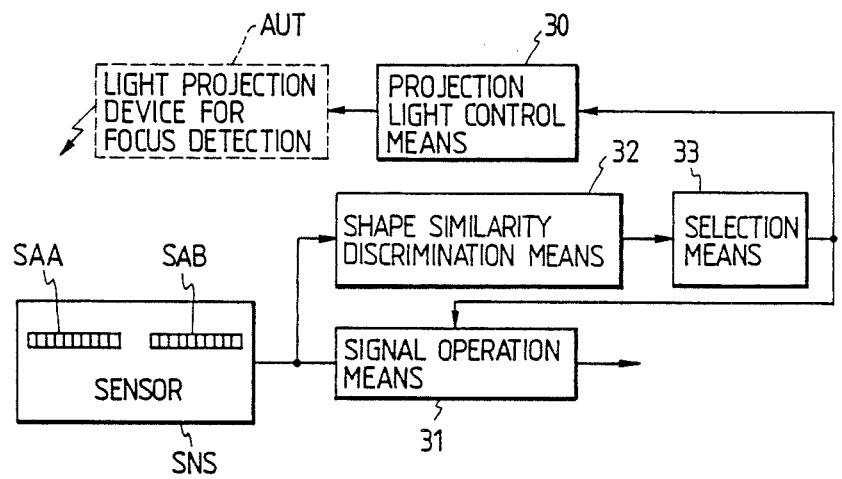
FIG. 20 is a block diagram showing still another embodiment of the present invention.

FIG. 20 is a block diagram showing another embodiment of the present invention. In FIG. 20, the light projection device AUT for focus detection is used in combination with the focus detecting device, and projects a projection light flux for focus detection onto an object in accordance with a command from the projection light control means 30 of the focus detecting device. Signal operation means 31 detects the focus state by the use of the outputs of photoelectric conversion element arrays SAA and SAB, shape similarity discrimination means 32 calculates and discriminates the shape similarity between two object images from the outputs of the photoelectric conversion element arrays SAA and SAB during the non-projection and the projection of the projection light flux for focus detection, and selection means 33 selects the outputs of the photoelectric conversion element arrays SAA and SAB during the projection of the projection light flux for focus detection so as to be used for the focus detection of the signal operation means 31 when it is discriminated by the shape similarity discrimination means 32 that the shape similarity during the non-projection period is below a predetermined standard.

When the AF control is executed by the first stroke of the release button, image signals are first obtained from the photoelectric conversion element arrays SAA and SAB with the light projection device AUT for focus detection being not operated. From these image signals, the shape similarity discrimination means 32 calculates shape similarity by a method which will be described later, and discriminates it. If this shape similarity is above a predetermined standard, the selection means 33 selects that the image signal obtained during non-projection of light is used by the signal operation means 31 and focus detection is effected. If the shape similarity is below the predetermined standard, the selection means 33 operates the projection light control means 30 so that the light projection device AUT for focus detection projects a projection light flux for focus detection onto the object. From the image signal during light projection, the shape similarity discrimination means 32 calculates shape similarity again and discriminates it. If this shape similarity is above the predetermined standard, the signal operation means 31 effects focus detection by the use of the image signals output from the photoelectric conversion element arrays SAA and SAB during light projection.

The details of the calculation and discrimination method by the shape similarity discrimination means 32 will now be described.

An example of the method is a method of calculating the shape similarity between two optical images on the basis of $$W(m_0) = \sum_i |A(i) - B(i - m_0)| \qquad (15)$$

The range of the sum is taken so that the suffixes i and i−$m_0$ are included in the section [1, N]. The meaning of the mathematical expression will now be diagrammatically described with the aid of the image signals. The equation (15) represents the area of the region indicated by hatching in FIG. 19 in which A(i) and B(i−$m_0$) of two images do not overlap each other and therefore, the greater is the value W of the equation (15), the lower is the shape similarity. The value W($m_0$) of the equation (15) depends on the amount of relative shift $m_0$ of the image A and the image B and therefore, it is necessary to choose the amount of relative shift $m_0$ so that the two images overlap each other best, and evaluate the value W. If use is made of the integer portion $m_0$ of the amount of image deviation derived in the process of the in-focus calculation, it will be just convenient.

There are two points to be considered in evaluating the value W. The first point is the problem of normalization. The shape similarity factor defined by the equation (15) depends on the contrast of the object as well, and even in the case of optical images of the same degree of quality, if the absolute signal level changes, the value W will also change. If for example, $A_1(i) = A(i)/2$ and $B_1(i) = B(i)/2$ are used in the equation (15), the value W also will become ½. This is a problem when viewed from the viewpoint of shape similarity, and need be normalized by the absolute value of the signal. As the normalization factors, the aforementioned equations (5a) and (5b) are suitable.

$$C = A_{max} - A_{min} \qquad (5a)$$
$$= MAX\{A(i)\} - MIN\{A(i)\}$$

$$C = \sum_{i=2}^{N} |A(i) - A(i - 1)| \qquad (5b)$$

B(i) may be used instead of A(i), and A(i) and B(i) may be used together. The equation (15) is divided by these normalization factors, and the shape similarity between two images is evaluated by $$W(m_0) = (1/C) \times \left( \sum_i |A(i) - B(i - m_0)| \right). \tag{16}$$

Figure 21:
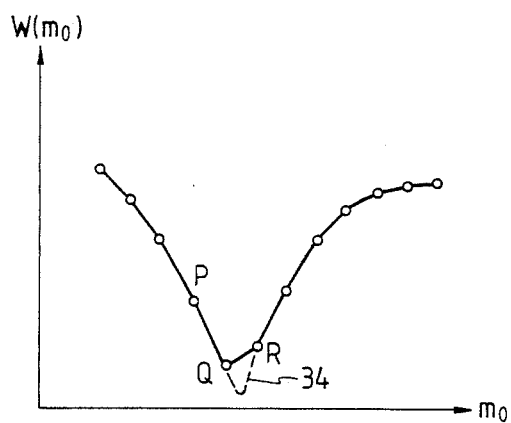
FIG. 21 illustrates a change in the shape similarity factor.

The second point to be noted is interpolation. $m_0$ can only assume desultory integer values and therefore, it is impossible to shift an amount corresponding to the true amount of image deviation which is a real number value, and evaluate the overlap of two images. Therefore, the behavior of the value $W(m_0)$ to $m_0$ is such as shown in FIG. 21, and the minimum of the value W evaluated by $m_0$ which is an integer value does not perfectly represent the incoincidence between two images. In the present invention, badly evaluating the degree of coincidence between images acts to increase the safety of the system and therefore is not a serious problem, but somewhat aggravates the system efficiency. To overcome this, the quadratic function approximation of broken line 34 may be effected, for example, by the use of a minimum point Q and the data P and R at the opposite sides thereof, and an extremal value may be supposed.

A threshold value F is provided to the normalized shape similarity factor $\tilde{W}$ found by the technique as described above, and when $$\tilde{W} > F, \tag{17}$$

the light projection device AUT for focus detection is caused to emit light, and the focus detection of the photo-taking lens is effected by the use of the photoelectric converted outputs received by the photoelectric conversion element arrays SAA and SAB during the light emission.

Figure 19A:
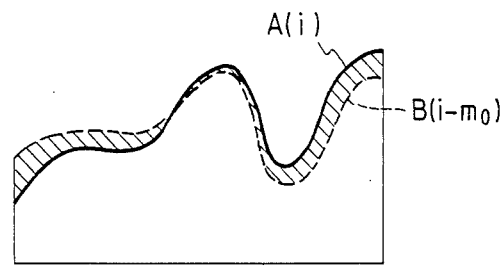
FIGS. 19A to 19C illustrate examples of image signals having low shape similarity.
Figure 19B:
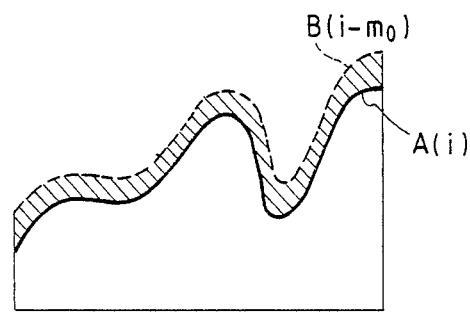
Figure 22A:
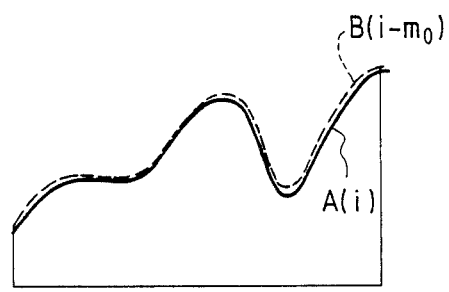
FIGS. 22A, 22B and 23 illustrate image signals obtained by the embodiment of FIG. 20.
Figure 22B:
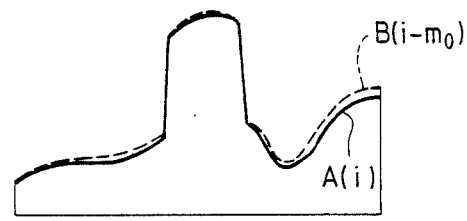

The principle by which optical images are improved for the light projection for focus detection is as follows. Where a ghost image rides on the optical image of the object, as shown in FIGS. 19A and 19B, there is the tendency that there is a level difference between two images and further the level difference changes gently in conformity with the position of the image (the position i). Generally, it is because the luminance of the object is relatively remarkably low as compared with a ghost light source that the optical image of the object is spoiled by ghost light and therefore, if light is projected onto the surface of the object, the luminance of the object will be improved and the influence of the ghost light will be relatively weakened. The projected light may be uniform illumination or illumination having a pattern, but projected light having a pattern is more desirable because it increases the contrast of the object. The improved photoelectric converted outputs when light projection for focus detection has been effected with uniform illumination and pattern illumination, respectively, in the case of FIG. 19(b) are shown in FIGS. 22A and 22B. In these figures, the vertical axis represents the signal level which is on any scale. In either case, the percentage of the ghost light component to the object surface information decreases relatively.

On the other hand, if the light projection for focus detection is effected during the far-and-near concurrence, the reflection of the projected light is greater in the amount of return from an object at a shorter distance and therefore, the object at the close distance side is naturally selected. Where two or more far and near objects are included in the focus detection field, it is often the case in a scene to be photographed that the main object at the close distance side lies with a far object as the background and therefore, it is more excellent as a choice to choose the close distance side. In the present method, the quantity of reflected light decreases in proportion to the square of the distance and therefore, the present method has a clear foreground choice.

Figure 19C:
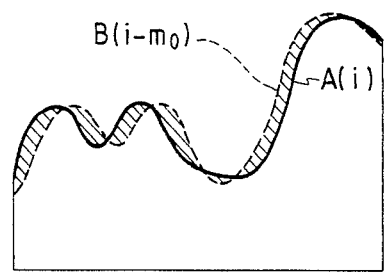
Figure 23:
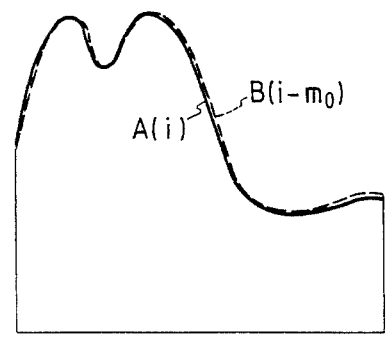

FIG. 19C shows the signals of two images during the far-and-near concurrence, and it is improved by the light projection for focus detection as shown in FIG. 23. In FIG. 19C, the right-hand side of the field of view is the background and the left-hand side is the foreground, and only the foreground is emphasized. In this case, uniform light projection for focus detection is more desirable than light projection for focus detection having a pattern. Or, even in the case of light projection having a pattern, it is desirable that the pattern be not localized in a narrow field of view, but be dispersed over a considerable area in the focus detection field. An example of the chart in which such patterns are arranged at random has already been proposed by the applicant.

As another shape similarity discrimination method in the present invention, use may be made of the digital Fourier conversion of the image signals A(i) and B(i). Since the power spectrum of Fourier conversion is shift-invariant, comparison of shape similarity can be made even if the alignment of two images is not effected. That is, by $$C_A(j) = \sum_i A(i)\cos(2\pi ij/N) \tag{18a}$$

$$S_A(j) = \sum_i A(i)\sin(2\pi ij/N) \tag{18b}$$

$$C_B(j) = \sum_i B(i)\cos(2\pi ij/N) \tag{18c}$$

$$S_B(j) = \sum_i B(i)\sin(2\pi ij/N), \tag{18d}$$

the Fourier power spectra of two images $$G_A(j) = C_A(j)^2 - S_A(j)^2 \tag{19a}$$

$$G_B(j) = C_B(j)^2 - S_B(j)^2 \tag{19b}$$

are calculated and compared with each other. The comparison method may be carried out by taking the sum of the absolute values of the differences between L comparative components and determining the magnitude of $$H = \sum_{j=1}^{L} |G_A(j) - G_B(j)|. \tag{20}$$

The above equation is not normalized and therefore, if $$H = \sum_{j=1}^{L} |G_A(j) - G_B(j)| / \sum_{j=1}^{N} G_A(j), \tag{21}$$

it will be better. If the above-mentioned value $\overline{H}$ exceeds a preset threshold value F, it is judged that the similarity between two images is bad. The normalization factor of the denominator of the equation (21) is $$\sum_{j=1}^{N} G_A(j) = \sum_{i=1}^{N} A(i)^2$$

by Persval's theorem and therefore can be calculated from $$H = \sum_{j=1}^{L} |G_A(j) - G_B(j)| / \sum_{i=1}^{N} A(i)^2 \quad (22)$$

and it will be seen that only L Fourier spectra can be found. In any of the cases of ghost light and far-and-near concurrence, the difference between the spectra of two images appears with a relatively low spatial frequency and therefore, the shape similarity between two images can be discriminated from a small number of Fourier components. If in the above-mentioned calculation, a window function which attenuates gradually at the opposite ends of the object area of Fourier conversion is applied to suppress the effect of the end portions, a more desirable effect will be obtained. Where the image signal shape similarity is discriminated by the present method, the discrimination may desirably be affected immediately after the "image signal input".

According to the embodiment described above, if within a distance in which the projection light flux for focus detection is effective for a far-and-near concurrence object or a backlit object whose optical image has been deteriorated by a ghost, the focus detection optical images will all be improved and accurate focus detection will become possible. The shape similarity discrimination means 32 can be constructed of simple software and therefore can be provided in a microcomputer carried in an auto focus camera in the standard fashion, and can be easily realized. Further, when it is judged that the shape similarity is below a predetermined standard, the projection light flux for focus detection is projected and therefore, the light projection can be minimized, and this is advantageous in respect of power consumption.

In the above-described embodiment, there has been provided a sequence in which shape similarity is discriminated by the use of an image signal formed in a state free of the projection light flux for focus detection and the projection light flux for focus detection is projected onto an object which has been discriminated as being weak in shape similarity, to thereby form an image signal again. However, adoption may be made of a sequence in which image signals during the projection and the non-projection of the projection light flux for focus detection are obtained and one of them is selected.

Figure 24:
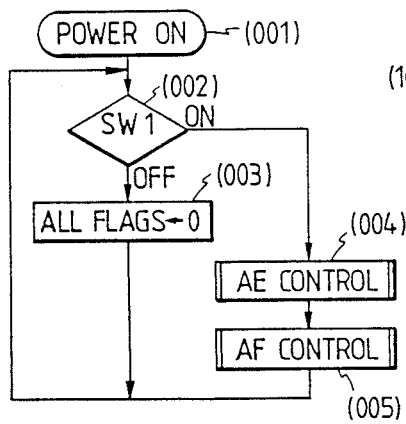
FIGS. 24 and 25 are program charts for illustrating the operation of the FIG. 20 embodiment.
Figure 25:
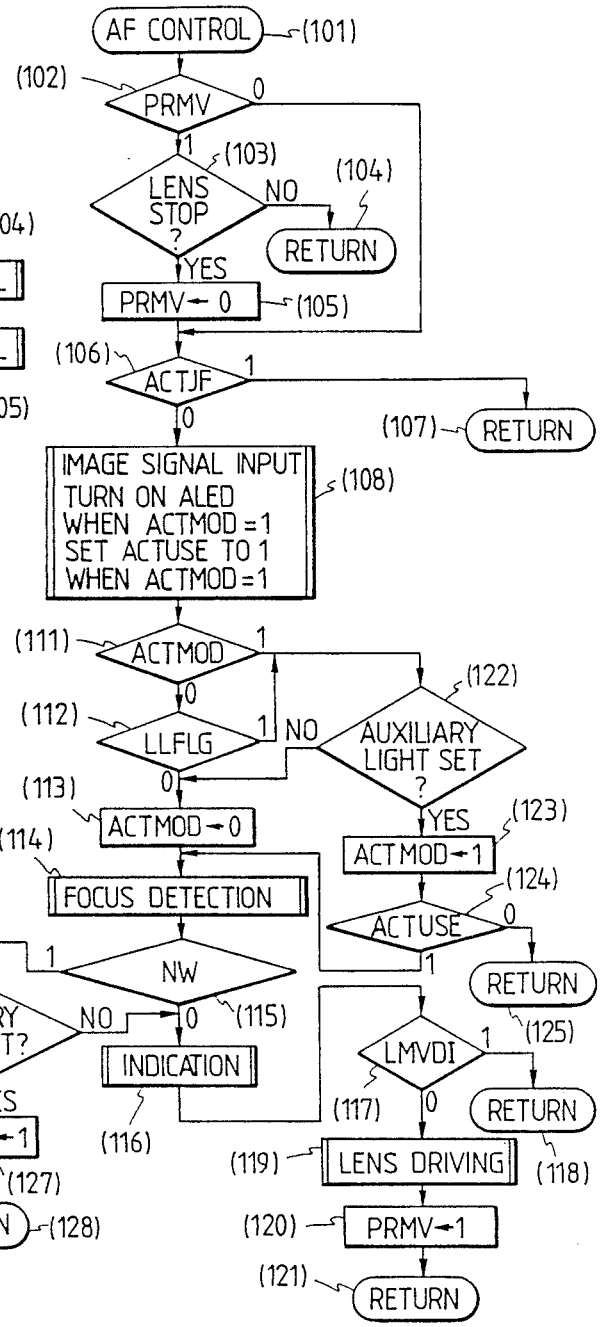

The circuit shown in FIG. 6 is used as the specific circuit construction of the FIG. 20 embodiment. FIGS. 24 and 25 are program flow charts illustrating the operation of the present embodiment described with reference to FIG. 20 by the use of the circuit shown in FIG. 6.

The operation of the camera in the FIG. 20 embodiment shown in FIG. 6 will hereinafter be described with reference to the flow charts of FIGS. 24 and 25.

When at step 001, a power source switch, not shown, is operated, the supply of electric power to the camera control device PRS is started and the camera control device PRS executes the sequence program stored in the memory ROM. When the execution of the sequence program is started, at step 002, the state of the first stroke switch SW1 adapted to be closed by the first stroke of the release button is detected, and when the first stroke switch SW1 is OFF, at step 003, flags for control set in the memory RAM in the camera control device PRS are all cleared. The detection of the state of the first stroke switch SW1 is accomplished by rendering the communication selection signal CDDR from the camera control device PRS into a high level, selecting the switch detection and display circuit DDR, transmitting the data signal SO as the state detection command of the first stroke switch SW1 to the switch detection and display circuit DDR to thereby effect the detection of the state of the first stroke switch SW1 by the switch detection and display circuit DDR, and transmitting the result thereof as a data signal SI to the camera control device PRS. The steps 002 and 003 are repetitively executed until the first stroke switch SW1 is closed or the power source switch is opened, and by the first stroke switch SW1 being closed, a shift is made to step 004.

The step 004 means the "AE control" subroutine. In this "AE control" sub-routine, a series of camera operations such as photometry calculation processes, exposure control, and shutter charge and film winding-up after exposure are performed. The "AE control" sub-routine has no direct relation with the present invention and therefore need not be described in detail, but the outline of the function of this sub-routine is as follows.

When the first stroke switch SW1 is ON, the "AE control" sub-routine is executed, and each time it is executed, the setting of the mode of the camera, photometry and exposure control calculation and display are effected. When the second stroke switch SW2 is closed by the second stroke of the release button, not shown, the release operation is started by the interruption processing function of the camera control device PRS, and the aperture or the shutter time is controlled on the basis of the exposure amount found by said exposure control calculation, and after the exposure control, shutter charge and film feeding operation are performed, photographing by one frame of the film is executed.

When the "AE control" is terminated at the step 004, the "AF control" sub-routine of step 005 is executed. The flowchart of the "AF control" sub-routine is shown in FIG. 25.

First, at step 102, the state of flag PRMV is detected. The flag PRMV, as will be described later, is a flag concerned in lens control, but as previously described, at step 003, all flags are cleared as long as the first stroke switch SW1 is OFF and therefore, when the "AF control" sub-routine of step 005 is called for the first time after the closing of the first stroke switch SW1, the flag PRMV also is 0, and a shift is made to step 106.

At the step 106, the state of flag ACTJF is detected. The flag ACTJF is a flag concerned in the control of the light projection for focus detection, and as previously described, the flag ACTJF also is 0 and therefore, a shift is made to step 108. The step 108 is the "image signal input" sub-routine, and by this sub-routine being executed, the digital signal of the image signal AOS from the sensor device SNS is stored at a predetermined address in the memory RAM in the camera control device PRS.

At step 111, the state of flag ACTMOD is detected. The flag ACTMOD is a flag representing that the mode is the light projection mode for focus detection. The control of the light projection for focus detection will be described later.

Since the flag ACTMOD also is 0 as previously described, a shift if made to step 112. At the step 112, the state of flag LLFLG is detected. The flag LLFLG is a flag set in the "image signal input" sub-routine of step 108, and is set to 1 when the luminance of the object is low. Here, the description will progress with it being assumed that the liminance of the object is sufficient (LLFLG=0) Since the flag LLFLG is 0, a shift is made to step 113, and the flag ACTMOD of the light projection mode for focus detection is cleared because the luminance of the object is sufficient.

At the next step 114, the "focus detection" sub-routine is executed. In this sub-routine, the focus state of the lens is calculatd from the image signal stored in the memory RAM, and if the lens is in the in-focus state, the in-focus flat JF is rendered into 1, and if focus detection is impossible due to the low contrast of the object, the focus detecton impossiblity flag AFNG is rendered into 1, and in the case of one of the two states, the lens driving inhibition flag LMVD1 for inhibiting lens driving is set to 1 and a return is made to the main routine. Also, when the contrast is high and the lens is not in focus, the defocus amount is found. At this time, the lens driving inhibition flag LMVD1 is held at 0. Further, when in spite of the contrast being sufficient, the shape similarity factor of the equation (16) is bad (that is, the value is great), it is inferred that there is mixing of ghost light or occurrence of far-and-near concurrence, and the shape similarity discrimination flag NW is set to 1. That is, in this focus detection sub-routine, the amount of deviation is found from the equations (1) and (2) and $\bar{W}$ is found from the equation (16), and when it is judged from the expression (17) that $\bar{W} > F$, the flag NW is set to 1.

At step 115, the state of the shape similarity discrimination flag NW is detected, and if this flag is 0, a shift is made to step 116. The case where the shape similarity discrimination flag NW is 1 will be described later.

At the next step 116, the "indication" sub-routine for indicating the in-focus or focus detection impossibility is executed. This is indicated by the display device DSP with predetermined data being communicated with the switch detection and display circuit DDR, but this operation has no direct relation with the present invention and therefore need not be described any more.

At the next step 117, the state of the lens driving inhibition flag LMVD1 is detected. As previously described, when lens driving is not necessary, the lens driving inhibition flag LMVD1 is set to 1 and therefore, if this flag is 1, at step 118, a return is made to the main routine. If this flag is 0, a shift is made to step 119, where the "lens driving" sub-routine is executed. When the "lens driving" sub-routine is terminated, at step 120, the lens driving execution flag PRMV is set to 1, whereafter at step 121 a return is made to the main routine. When the return is made to the step 002 of the main routine of FIG. 24, the "AE control" and "AF control" sub-routines are repeated as long as the first stroke switch SW1 is ON.

Assuming that in the main routine of FIG. 24, the "AF control" sub-routine of step 005 has been called again (for the second time), at step 102, the state of the lens driving execution flag PRMV is detected. If the in-focus determination or the focus detection has been impossible in the last "AF control" subroutine, the lens driving execution flag PRMV is 0 and therefore, the flow of step 106 and subsequent steps is executed again. If lens driving has been effected at the last time, a shift is made to step 103 because the lens driving execution flag PRMV is set to 1. At the step 103, communication is effected with the control circuit LPRS in the lens and the current driving situation of the lens is detected, and if it is informed from the lens side that the predetermined driving instructed at step 118 has been terminated, at step 105, the lens driving execution flag PRMV is rendered into 0, and the flow of step 106 and subsequent steps is executed. This discrimination is accomplished by the camera control device PRS detecting the pulse signal SENC from the encoder circuit ENC. Also, if it is notified from the lens that lens driving is still going on, shift is made to step 104 and a return is made to the step 002 of the main routine. Thus, in the "AF control" sub-routine, a new focus detecting operation and lens control are effected only in a state in which the lens is not driven.

The operations concerned with the light projection for focus detection will now be described.

There are two conditions for starting the light projection for focus detection, i.e., the case of low luminance and the case where the shape similarity between image signals is bad. If in the "AF control" sub-routine, the luminance of the object is low, at step 108, the flag LLFLG is set to 1, and a shift is made to step 122 by the detection of the state of the flag LLFLG at step 112. At the step 122, the state of the mounting member for the light projection device AUT for focus detection is detected, and if the light projection device AUT is not mounted, a shift is made to step 113, where the same operation as the ordinary one previously described is performed. If the light projection device AUT is mounted a shift is made to step 123, where the light projection mode flag ACTMOD for focus detection is set to 1. Where the light projection device AUT for focus detection is contained in the camera body, the step 122 is omitted.

Subsequently, at step 124, the state of the light projection use flag ACTUSE is detected. The light projection use flag ACTUSE is a flag adapted to be set to 1 when the "image signal input" sub-routine of step 108 is executed when light projection has been actually done (in a state in which the light projection mode flag ACTMOD for focus detection has been set to 1). In the situation now under discussion, the light projection mode for focus detection has been brought about for the first time and therefore, before that, light projection has not been done, and at step 125, a return to the main routine is one made. That is, in this case, the image signal data input at the step 108 is abandoned, and in the next "AF control" subroutine, an image signal is input with light being projected, and this is used for focus detection.

On the other hand, if in the above-mentioned "AF control" sub-routine, the shape similarity between the two AF image signals A(i) and B(i) is bad, the shape similarity discrimination flag NW is set to 1 in the "focus detection" sub-routine of step 114, and the program branches off to step 126. At the step 126, the state of the mounting member for the light projection device AUT for focus detection is detected, and if the light projection device AUT is not mounted, a shift is made to step 116, where the same operation as the ordinary one hitherto described is performed. If the light projection device AUT is mounted, a shift is made to step 127, where the light projection mode flag ACTMOD for focus detection is set to 1, and at step 128, a return to the main routine is once made from the "AF control" sub-routine.

When the "AF control" sub-routine is called again in the state in which at the step 123 or the step 127, the light projection mode flag ACTMOD for focus detection has been set to 1 for the first time, SAL is rendered into H level and the auxiliary light is turned on in the "image signal input" sub-routine of step 108, and an image signal is input with light being projected, and a shift is made to step 122 by the detection of the state of the light projection mode flag ACTMOD for focus detection at step 111. If the light projection device AUT for focus detection is not dismounted in the meantime, a shift is made to step 123. If the light projection device AUT for focus detection is dismounted, a shift is made to step 113, where the light projection mode flag ACTMOD for focus detection is rendered into 0 and the light projection mode for focus detection is cancelled, and a return is made to the ordinary "AF control" sub-routine.

At step 124 via steps 122 and 123, the state of the light projection use flag ACTUSE is detected. At step 108, this flag has already been set to 1 and therefore, a shift is made to step 114, where the "focus detection" sub-routine is executed. The subsequent steps are similar to the ordinary "AF control" sub-routine.

As described above, when the luminance of the object is low or the shape similarity between the AF image signals is bad and the light projection device AUT for focus detection has been mounted, the mode becomes the light projection mode for focus detection and the focus detecting operation is performed on the basis of the image signal under projected light, but when the lens has become in focus with light being projected, the in-focus flag ACTJF is set to 1 in the "focus detection" sub-routine of step 114 and therefore, a shift is made from step 106 to step 107, and a return is made to the main routine. That is, when the lens has become in focus with light being projected, the focus detecting operation and lens driving are not performed again until the first stroke switch SW1 is opened.

Although the foregoing description of the embodiments shows a focus detecting device of the type in which the amount of focus adjustment is found from the amount of image deviation, the present invention is of course applicable to a device of the type in which the object distance is found from the amount of image deviation.

We claim:

1. A focus detecting device for detecting a focusing state of an imaging optical system or a distance to an object on the basis of outputs from first and second photoelectric converting portions receiving light from the object, comprising:
    (a) a calculation circuit for calculating regularity of a brightness-darkness pattern of the object for regularity of output signals of said photoelectric converting portions, on the basis of the outputs of said photoelectric converting portions; and
    (b) a discrimination circuit for discriminating strength of the regularity calculated by said calculation circuit and outputting a signal for commanding light projection means to project light when it is discriminated that said regularity is strong.

2. A focus detecting device according to claim 1, further comprising the light projection means which performs its light projecting operation in response to the signal from said discrimination circuit.

3. A focus detecting device according to claim 2, wherein said light projection means effects pattern light projection.

4. A focus detecting device according to claim 1, wherein each of the first and second photoelectric converting portions has a plurality of photoelectric converting elements, and wherein said calculation circuit and said discrimination circuit find a correlation amount during each of a plurality of shifts while shifting the positional relation between the output signals of a first photoelectric conversion element array and a second photoelectric conversion element array which comprises the first and second photoelectric converting portions respectively, and wherein said discrimination circuit discriminates that the regularity is strong when a number indicative of a correlation amount greater than a predetermined one of the correlation amounts found during said shifts is greater than a predetermined number.

5. A focus detecting device according to claim 1, wherein the first and second photoelectric converting portions each have a plurality of photoelectric conversion elements, and wherein said calculation circuit and said discrimination circuit compare signals output from the photoelectric conversion elements with a predetermined value, and wherein said discrimination circuit discriminates that the regularity is strong when the result of the comparison with the output signals of the elements exhibits a regular variation.

6. A focus detecting device according to claim 5, wherein the comparing operation is performed for the outputs of the elements of one of the first and second photoelectric converting portions.

7. A focus detecting device for detecting a focusing state of an imaging optical system or a distance to an object on the basis of outputs from first and second photoelectric converting portions receiving light from the object, comprising:
    (a) a comparison circuit for comparing signals output from a plurality of photoelectric conversion elements forming the first and second photoelectric converting portions with a predetermined value; and
    (b) a discrimination circuit for discriminating whether the result of the comparison of the output signals with said predetermined value exhibits a regular variation, and for detecting a regularity of a brightness-darkness pattern of the object.

8. A focus detecting device according to claim 7, wherein said comparing operation is performed for the outputs of the elements of one of said first and second photoelectric converting portions.

9. A focus detecting device for detecting a focusing state of an imaging optical system or a distance of an object on the basis of outputs from first and second photoelectric converting portions receiving light from the object when light is not projected from light projections means or when light is projected from the light projection means, comprising:
    (a) a calculation circuit for calculating a regularity of a brightness-darkness pattern of a surface of the object or a regularity of output signals of said photoelectric converting portions, on the basis of the outputs of said photoelectric converting portions in the non-light projecting state, and for discriminating a strength of said regularity; and
    (b) a control circuit for effecting the detection of the focusing state or the distance based on the outputs of said first and second photoelectric converting portions in the light projecting state when the regularity is discriminated as being strong by said calculation circuit.

10. A focus detecting device for detecting a focusing state of an imaging optical system or a distance to an object on the basis of outputs from first and second photoelectric converting apparatus receiving light from the object, comprising:
   (a) a calculation circuit for calculating a brightness/darkness rate of a brightness-darkness pattern of a surface of the object on the basis of the outputs of the photoelectric converting portions, and for discriminating a magnitude of said deviation rate; and
   (b) an instruction circuit outputting a signal for commanding light projection means to project light when said deviation rate is discriminated as being small by said calculation circuit.

11. A focus detecting device according to claim 10, wherein said calculation circuit finds output signal differences between adjacent ones of a plurality of photoelectric conversion elements which comprise each of the photoelectric converting portions, and wherein said calculation circuit discriminates that said deviation rate is small when an output signal difference in a predetermined order from the greatest one of said output signal differences is smaller than a predetermined value.

12. A focus detecting device according to claim 10, wherein said calculation circuit finds output signal differences between adjacent ones of a plurality of photoelectric conversion elements which comprise each of the photoelectric converting portions, and wherein said calculation circuit discriminates that said deviation rate is small when a sum of the output signal differences up to the output signal difference in a predetermined order from the greatest one of said output signal differences is smaller than a predetermined value.

13. A focus detecting device according to claim 10 wherein said calculation circuit finds an N power sum of output signal differences between adjacent ones of a plurality of photoelectric conversion elements which comprise each of the photoelectric converting portions, and wherein said calculation circuit discriminates a magnitude of said deviation rate in conformity with the N power sum of said output signal differences.

14. A focus detecting device according to claim 10, wherein the brightness-darkness deviation rate is calculated on the basis of an output from one of the converting portions of the first and second photoelectric converting portions.

15. A focus detecting device for detecting a focusing state of an imaging optical system or a distance to an object on the basis of output signals from first and second photoelectric converting portions receiving light from the object, comprising:
   a calculation circuit for finding output signal differences between adjacent ones of a plurality of photoelectric conversion elements which comprise the photoelectric converting portions, and for calculating a brightness/darkness deviation rate on the basis of the output signal differences in a predetermined order from the greatest ones of said output signal differences or the output signal differences in a predetermined order from the greatest one of said output signal differences.

16. A focus detecting device according to claim 15, wherein the operation of finding the output signal difference is performed by detecting output signals of elements comprising one of the converting portions of the first and second photoelectric converting portions.

17. A focus detecting device for detecting a focusing state of an imaging optical system or a distance to an object on the basis of output signals from first and second photoelectric converting portions receiving light from the object, comprising:
   a calculation circuit for finding an N power sum of output signal differences between adjacent ones of a plurality of photoelectric conversion elements which comprise the photoelectric converting portions, and for calculating a brightness/darkness deviation rate in conformity with the N power sum of said output signal differences.

18. A focus detecting device according to claim 17, wherein the operation of finding the output signal differences is performed by detecting output signals of elements comprising one of the converting portions of the first and second photoelectric converting portions.

19. A focus detecting device for detecting a focusing state of an imaging optical system or a distance to an object on the basis of outputs from first and second photoelectric converting portions receiving light from the object with light being not projected from light projection means or with light being projected from the light projection means, comprising:
   (a) a calculation circuit for calculating a brightness/darkness deviation rate of a brightness-darkness pattern of a surface of the object on the basis of the outputs of the photoelectric converting portions in said non-light projected state, and for discriminating a magnitude of said brightness/darkness deviation rate; and
   (b) a control circuit for effecting the detection of the focusing state or the distance based on the outputs of the first and second photoelectric converting portions in said light projected state when it is discriminated by said calculation circuit that said brightness/darkness deviation rate is small.

20. A focus detecting device according to claim 19, wherein the brightness-darkness deviation rate is calculated on the basis of an output from one of the converting portions of the first and second photoelectric converting portions.

21. A focus detecting device for detecting a focusing state of an imaging optical system or a distance to an object on the basis of outputs from first and second photoelectric converting portions receiving an image from the object, comprising:
   (a) a calculation circuit for calculating a shape similarity between images of the object respectively formed on the first and second photoelectric converting portions on the basis of the outputs of said photoelectric converting portions, and for discriminating a magnitude of the shape similarity; and
   (b) an instruction circuit for outputting a signal for commanding light projection means to project light when the shape similarity is discriminated as being small by said calculation circuit.

22. A focus detecting device according to claim 21, wherein the first and second photoelectric converting portions are respectively comprised of a first and second photoelectric conversion element array and a second photoelectric conversion element array each having a plurality of photoelectric conversion elements, and wherein said calculation circuit calculates a sum of difference signals between output signals of the elements of the first photoelectric conversion element array and the output signals of those of the elements of the second photoelectric conversion element array whose positions are shifted by a predetermined amount relative to the elements at the positions corresponding to the elements of the first photoelectric conversion element array, and wherein said calculation circuit discrimination the shape similarity as being small when a value conforming to said sum is greater than a predetermined value.

23. A focus device for detecting a focusing state of an imaging optical system or a distance to an object on the basis of outputs from first and second photoelectric converting portions receiving an illumination distribution from the object with light being not projected from light projection means or with light being projected from the light projection means, comprising:
  (a) a calculation circuit for calculating a shape similarity between the illumination distributions of the object respectively formed on the first and second photoelectric converting portions on the basis of the outputs of the photoelectric converting portions in said non-light projected state, and for discriminating a magnitude of said shape similarity; and
  (b) a control circuit for effecting the detection of the focusing state or the distance based on the outputs of the first and second photoelectric converting portions in said light projected state when the shape similarity is discriminated as being small by said calculation circuit.

* * * * *

UNITED STATES PATENT AND TRADEMARK OFFICE
CERTIFICATE OF CORRECTION

PATENT NO. : 4,980,716

DATED : December 25, 1990

INVENTOR(S) : Kenji Suzuki, et al.

It is certified that error appears in the above-identified patent and that said Letters Patent is hereby corrected as shown below:

COLUMN 2:

Line 27, "applicant" should be deleted.

COLUMN 3:

Line 7, "inversion" image" should read --inversion of the sign between $V(m_0)$ and $V(m_0 + 1)$, the amount of image--.

COLUMN 6:

Line 40, "148" should read --14B--.

COLUMN 9:

Line 60, "certain m1" should read --certain $m_1$--.

COLUMN 13:

Line 32, "focus" should read --focus detecting--.

COLUMN 16:

Line 23, "Persval's theorem" should read --Petzval's theorem--.

UNITED STATES PATENT AND TRADEMARK OFFICE
CERTIFICATE OF CORRECTION

PATENT NO. : 4,980,716
DATED : December 25, 1990
INVENTOR(S) : Kenji Suzuki, et al.

It is certified that error appears in the above-identified patent and that said Letters Patent is hereby corrected as shown below:

COLUMN 17:

Line 8, "determiner" should read --selection--.

Line 9, "selects" should read --determines--.

COLUMN 22:

Line 27, "side" should be deleted.

Line 34, "side" should be deleted.

COLUMN 25:

Line 5, "$W(m_0) = (1/C) \times \left( \sum_i |A(i) - B(i - m_0)| \right).$"

should read $$--\hat{W}(m_0) = (1/C) \times \left( \sum_i |A(i) - B(i - m_0)| \right).--$$

UNITED STATES PATENT AND TRADEMARK OFFICE
CERTIFICATE OF CORRECTION

PATENT NO. : 4,980,716

DATED : December 25, 1990

INVENTOR(S) : Kenji Suzuki, et al.

It is certified that error appears in the above-identified patent and that said Letters Patent is hereby corrected as shown below:

COLUMN 26:

Line 63, "$H = \sum_{j=1}^{L} |G_A(j) - G_B(j)| / \sum_{j=1}^{N} G_A(j),$"

should read

--$\tilde{H} = \sum_{j=1}^{L} |G_A(j) - G_B(j)| / \sum_{j=1}^{N} G_A(j),$--.

COLUMN 27:

Line 5, "Persval's theorem" should read
--Petzval's theorem--.

Line 8, "$H = \sum_{j=1}^{L} |G_A(j) - G_B(j)| / \sum_{j=1}^{N} A(i)^2$"

should read

--$\tilde{H} = \sum_{j=1}^{L} |G_A(j) - G_B(j)| / \sum_{j=1}^{N} A(i)^2$--.

UNITED STATES PATENT AND TRADEMARK OFFICE
CERTIFICATE OF CORRECTION

PATENT NO. : 4,980,716

DATED : December 25, 1990

INVENTOR(S) : Kenji Suzuki, et al.

It is certified that error appears in the above-identified patent and that said Letters Patent is hereby corrected as shown below:

COLUMN 32:

Line 50, "said" should read --the--.

Line 51, "said" should read --the--.

COLUMN 33:

Line 68, "ference" should read --ferences--.

COLUMN 35:

Line 9, "crimination" should read --criminates--.

Signed and Sealed this

Twenty-seventh Day of October, 1992

*Attest:*

DOUGLAS B. COMER

*Attesting Officer*     *Acting Commissioner of Patents and Trademarks*